United States Patent
Bodnar

(10) Patent No.: US 6,544,295 B1
(45) Date of Patent: Apr. 8, 2003

(54) METHODS FOR MANAGING PREFERRED INTERNET SITES IN A COMPUTER SYSTEM HAVING A BROWSER

(75) Inventor: Eric O. Bodnar, Capitola, CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 08/749,630

(22) Filed: Nov. 18, 1996

(51) Int. Cl.<sup>7</sup> ............................................. G06F 15/16
(52) U.S. Cl. ............................................... 111896/709
(58) Field of Search ...................... 395/200.48, 200.49, 395/200.53, 682; 707/1, 10; 709/217, 218, 219, 223, 302

(56) References Cited

U.S. PATENT DOCUMENTS

| | | | | |
|---|---|---|---|---|
| 5,701,423 A | * | 4/1994 | Crozier ........................ | 395/335 |
| 5,764,906 A | * | 6/1998 | Edelstein et al. ...... | 395/200.49 |
| 5,764,910 A | * | 6/1998 | Shacher ................. | 395/200.53 |
| 5,784,619 A | * | 7/1998 | Evans et al. ................ | 395/682 |
| 5,790,793 A | * | 8/1998 | Higley .................. | 395/200.48 |
| 5,877,765 A | * | 3/1999 | Dickman et al. ........... | 345/349 |
| 5,963,964 A | * | 10/1999 | Nielsen ....................... | 707/501 |
| 6,020,884 A | * | 2/2000 | MacNaughton et al. .... | 345/329 |
| 6,202,000 B1 | * | 3/2001 | Tran ................................. | 707/3 |

* cited by examiner

Primary Examiner—Moustafa M. Meky
Assistant Examiner—Tod Kopstas
(74) Attorney, Agent, or Firm—Darryl A. Smith

(57) ABSTRACT

A computer system having a "browse" connected to an on-line service (e.g., Internet) is providing with a "Quick" marks utility, which lets a user easily organize programs, Web sites, and other items in tabs, and start them with a single click. The utility provides an interface having a manageable lists of marks organized by tabs, folders, and visual icons. Buttons on the Quick marks utility let the user start programs or jump to a Web site. When the user clicks an Internet Quick marks button, the system launches the user's Web browser and connects the user to that Web site. After the browser is launched, the user can continue to click different Quick marks buttons to connect quickly to desired sites. The utility includes an abstraction layer which operates in conjunction with various drivers. The abstraction layer provides an interface allowing applications to communicate with the system and request Quick mark services. The workhorse routines, on the other hand, are encapsulated within the various drivers. The particulars of a Quick mark item are handled by a Quick mark (QMX) driver, which provides an extension—driver-specific API—for handling the item. With this architecture, the particular details of handling a mark (i.e., whether it is a URL, whether it is a pointer to a file, whether it is a document, or the like) are abstracted to a level which removes or decouples it from the management of the mark.

13 Claims, 16 Drawing Sheets

| ○ What's New | | | ◻◰⊠ |
|---|---|---|---|
| Name | Updated | Type | △ |
| 📄 Infoseek Personal | 8/26/96 4:30 PM | Internet QuickMark | |
| 📄 NewsPage | 10/4/96 5:14 PM | Internet QuickMark | |
| 📄 PCWorld Online | 8/23/96 1:24 PM | Internet QuickMark | |
| 📄 TechWeb | 8/22/96 3:44 PM | Internet QuickMark | |
| 📄 CNN Interactive | 10/4/96 5:17 PM | Internet QuickMark | |
| 📄 Reuters | 10/4/96 5:18 PM | Internet QuickMark | |
| 📄 PC Week | 10/4/96 5:19 PM | Internet QuickMark | |
| 📄 InfoWorld Electronic | 10/4/96 5:20 PM | Internet QuickMark | |
| 📄 c/net | 10/4/96 5:21 PM | Internet QuickMark | |
| 📄 San Jose Mercury News | 8/24/96 5:22 PM | Internet QuickMark | |
| 📄 USA Today | 10/4/96 5:23 PM | Internet QuickMark | |
| 📄 New York Times | 10/4/96 5:24 PM | Internet QuickMark | |
| 📄 CalendarLand | 10/4/96 5:25 PM | Internet QuickMark | |
| 📄 PC Quote | 9/14/96 9:16 PM | Internet QuickMark | |
| 📄 Gigaplex | 10/4/96 5:26 PM | Internet QuickMark | |
| 📄 GNN | 10/4/96 4:27 PM | Internet QuickMark | |
| 📄 Virtual Places | 10/4/96 5:26 PM | Internet QuickMark | |
| 📄 ESPNET SportsZone | 10/4/96 2:12 PM | Internet QuickMark | |
| 📄 Compu Talk | 10/4/96 3:14 PM | Internet QuickMark | |
| 📄 Windows95 | 10/4/96 3:19 PM | Internet QuickMark | |
| 📄 GolfWeb | 8/22/96 3:44 PM | Internet QuickMark | ▽ |

*FIG. 7*

METHODS FOR MANAGING PREFERRED INTERNET SITES IN A COMPUTER SYSTEM HAVING A BROWSER

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to use of a computer with the Internet and, more particularly, methods for managing a user's own preferred Internet sites in a computer system having an Internet or other on-line browser.

With the ever-increasing popularity of the Internet, more and more personal computers (PC's) provide Internet access to users, typically through an Internet "browser" such as Microsoft Internet Explorer or Netscape Navigator. A browser is a form of an "Internet application." In general terms, an Internet application is an application which includes the ability to access a URL (Universal Request Locator) or "Web" site. The Internet itself is not so much defined by various connections between computers as it is by the content which it holds. A common format for representing information on the Internet is HTML or "Hyper Text Markup Language." A browser, acting as an Internet application, accesses HTML data through the Internet. Other applications can serve as Internet applications. Microsoft Word, a popular desktop word processing program, can serve as an Internet application because it too can use a URL to access information or content from the Internet.

For the individual user, use of the Internet can range from casual to frequent use. Typically, a user has some number of "favorite" spots or locations on the Internet that he or she "visits" once or twice a week, or all the time. As one uses the Internet more frequently, there tends to be more and more favorite locations—that is, locations where one desires to store a reference to, so that one can return to that location with ease.

Given this on-line environment, one characterized by an increasing number of PC's connected to the Internet, a number of problems arise. One common problem encountered, for instance, is the task of personalizing and organizing a "subset" of the Internet continuum—that is, "marking" the Internet (i.e., creating bookmarks). A URL is, in and of itself, a "mark." Its usefulness as a mark, however, cannot be realized unless the URL is collected and organized together with other marks which are of interest to the user.

Another problem which faces the environment is that although the URL's are "universal," the marks which store references to them are usually not universal. A user typically sets up a number of bookmarks in his or her browser (e.g., Netscape Navigator), for instance, but those marks are no longer available to the user once the user switches to another browser or another Internet application. This problem arises because the marks reside within the context of the browser, not within the context of the Internet.

Expectedly, the task of sharing one's marks with other users is problematic. For instance, a user might have collected some marks on his or her machine at work and desired to swap those marks to a home PC. The user can no more easily share marks among the user's own machines than he or she can with other users. If the user has created a useful collection of marks, say for baseball Web site locations, the user cannot easily publish or otherwise transfer that collection to other users. Today, if one wants to reproduce bookmarks, he or she must manually reenter each one. Although this is perhaps acceptable for exchanging one URL mark, the approach is unacceptable for exchanging a list of marks and the organization of such a list. All told, although a URL itself is universal, the storage of the URL—including how it is organized and cataloged (e.g., Microsoft Internet Explorer "favorites" vs. Netscape Navigator "bookmarks")—is unique to the Internet application or to the underlying operating system. As a result, the marks are not necessarily compatible with one another, thus making them difficult or impossible to exchange.

The problem is even more general, however. There are other on-line "locations" which the user might desire to store as a mark. Besides Internet URL's, for example, the user might desire to store a "mark" to a location on a particular proprietary service, such as CompuServe or America On-line (AOL). Although each of these locations is not a URL location, the user nevertheless desires to treat such a location in the same manner as he or she would treat an Internet mark. Again, one runs into application-specific problems with marking such locations. In the case of Netscape Navigator, for instance, one can only mark URL's. In the case of Microsoft Internet Explorer, on the other hand, one might be able to create a "shortcut" to non-URL locations. Such a "shortcut" would, however, be a Microsoft proprietary solution, thus limiting the ability of the user to share such a mark with other users. In the specific instance of Microsoft Internet Explorer, each "shortcut" exists as a separate file on one's system, the interpretation of which is proprietary to Microsoft's Internet Explorer.

As a common example of the difficulty of exchanging marks, consider for instance a Netscape Navigator user who desires to exchange marks with another user who happens to use Microsoft Internet Explorer. As each respective set of marks is stored in its own proprietary format, the users must resort to manually entering each mark, a tedious task at best. Further complicating this difficulty, each user is unable to access his or her own marks without the respective proprietary browser which created the marks in the first place. Once one does use the appropriate browser to access a mark, the mark can only be used to drive the operation of that browser.

Another problem which presents itself in such an environment is how one manages large lists of marks. As use of the Internet by a particular user becomes more frequent, that user tends to build up a large collection of interesting content on the Internet. Once a particular list becomes large, finding an item of interest on that list becomes a task in itself. One approach to simplifying management is to arrange a list hierarchically, such as in an outline format using "folders." Since the approach still relies on a textual representation of a mark, however, there is a limit to its usefulness. Unlike a file-based Explorer where different file types can be represented by different icons, hierarchical representation of marks have been implemented as large lists of texts where differences between individual entries cannot be discerned at a glance. Although Microsoft Internet Explorer allows one to attach an icon to each mark item, the end result is a hierarchical list of marks with the very same icon repeated many times (thereby, providing little or no benefit). Here, the unique visual identifying feature of each item is its name, which is often long and difficult to read, if not completely cryptic. Given many bookmarks, therefore, the icons are of no value as they are all the same. Hierarchically-arranged lists help; nevertheless, the user has difficulty visually associating the correct item because the user must process numerous lines of text (which largely all look the same).

Another problem facing such an environment is that there exists marks whose corresponding sites are of interest to the user only periodically. A site which lists announcements or posts news items, for example, is of interest to the user at the point when content has actually changed. What is desired is a mechanism where one's system can efficiently determine when content of interest has changed. One approach is to have a service automatically send the user the content or notification of change in the content. Such an approach requires back-end support, together with appropriate authorizations being secured beforehand. What one really wants is to have his or her individual client machine be able to determine readily when content at a location of interest has changed.

HTTP (Hyper Text Transport Protocol) supports the ability of an HTTP server to indicate when its content was last updated. This approach relies on the content provider for correctly configuring the HTTP server for providing this information. What one finds in practice, however, is that HTTP servers are often configured to simply indicate that the content is always updated (always new). Here, if a browser client inquires whether the content is new, the HTTP server always replies that the content is new, even when the content really has not changed. Although the capability exists to indicate whether content is new, the current implementation does not provide very accurate information in this regard.

Although the user might desire to know when content of interest has changed, one often has interest in only particular portions of that content. For instance, a Web site of interest to the user might include revolving advertisements and, thus, has content which is constantly changing. At the same time, however, the user is only interested in the non-advertisement material. In this scenario, an HTTP server would indicate that the content is always new. The content which is really of interest, however, is not new.

All approaches to date at addressing these problems have been application centric. One is forced to use marks within the context of one's particular application, not within the context of the Internet. Except for the ability of the user to assign a few icons, there is no visual cue for marks provided to the user. Instead, the user must rely on textual identification. Further, approaches to date have treated marks as pointers to URL's, in effect abandoning the ability of the user to readily access on-line locations which are not Web sites. Instead of this URL-specific version of a pointer, what the user really wants is a generic pointer—one which allows the user to easily navigate to a particular location on-line.

SUMMARY OF THE INVENTION

The present invention provides a Quick marks utility which lets the user easily organize programs, Web sites, and other items in tabs, and start them with a single click. Its particular interface comprises a manageable lists of marks which is organized by tabs, folders, and visual icons. Buttons on the Quick marks utility let the user start programs or jump to a Web site. When the user clicks an Internet Quick marks button, the system launches the user's Web browser and connects the user to that Web site. After the browser is launched, the user can continue to click different Quick marks buttons to connect quickly to desired sites. In typical operation, the Quick marks utility is set up by the user so that his or her most frequently-used quick marks are buttons, where the user can easily access them. The user can employ tabs to group these buttons by type, program, task, or project. In a preferred embodiment, the Quick marks utility is provided as a "plug in" for a Control Center user interface. The actual Quick marks plug-in includes user interface and memory management components, which may be implemented in a conventional manner.

Of particular interest to the present invention is that component or subsystem which comprises an abstraction layer which operates in conjunction with various drivers. The abstraction layer provides an interface allowing applications to communicate with the system and request Quick mark services. The workhorse routines, on the other hand, are encapsulated within the various drivers. The particulars of a Quick mark item are handled by a Quick mark (QMX) driver, which provides an extension—driver-specific API (application programming interface)—for handling the item. With this architecture, the particular details of handling a mark (i.e., whether it is a URL, whether it is a pointer to a file, whether it is a document, or the like) are abstracted to a level which removes or decouples it from the management of the mark.

The plug-in's memory manager provides memory management largely by managing a linked list of objects. This module allows a mark to be abstracted into an item in the list of objects. The manager provides a list of containers and items. Containers can contain other containers (i.e., nested containers) and/or contain items. The items themselves may comprise "folders" and "areas." The two differ in that an area has a specific association with a driver. Imported Netscape bookmarks or imported Microsoft Internet Explorer Favorites each represent an area—that is, an item associated with a specific driver. In this manner, different areas can be established, each area having its own particular I/O handling provided by a driver specific for that area. Further, however, each area can contain folders, and each folder, in turn, can contain one or more marks.

The mark information itself is stored in a Quick marks database; each mark is stored in the storage in a machine-specific format. At the same time, however, a "Cool" I/O layer is provided to manage storage of mark information in a "Cool" marks database, in machine-independent format. Consider, for instance, storage of two marks: a URL and a file. Because of its universal nature, a URL is easily translated, regardless of which machine employs it; it simply points to a place on the Internet. What a "file" points to, on the other hand, changes from one computer to another. The file itself does not change. However, interpretation of the file changes from one computer to another. A cool mark for a file, as stored in the "Cool" marks database, is unresolved. For the Quick mark database or storage, on the other hand, it is resolved (since it resides on a specific machine). The system provides a translation mechanism whereby a mark residing in the "Cool" marks database can be translated into a corresponding mark in the Quick marks storage. For translation of a "file" item, for instance, the system would resolve where the file is located on the specific machine. If a location is found, the system augments or supplements the generic description with a specific description.

BRIEF DESCRIPTION OF THE DRAWINGS

FIG. 7 is a bitmap screen shot illustrating an interface for displaying a list of new and removed items.

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1:
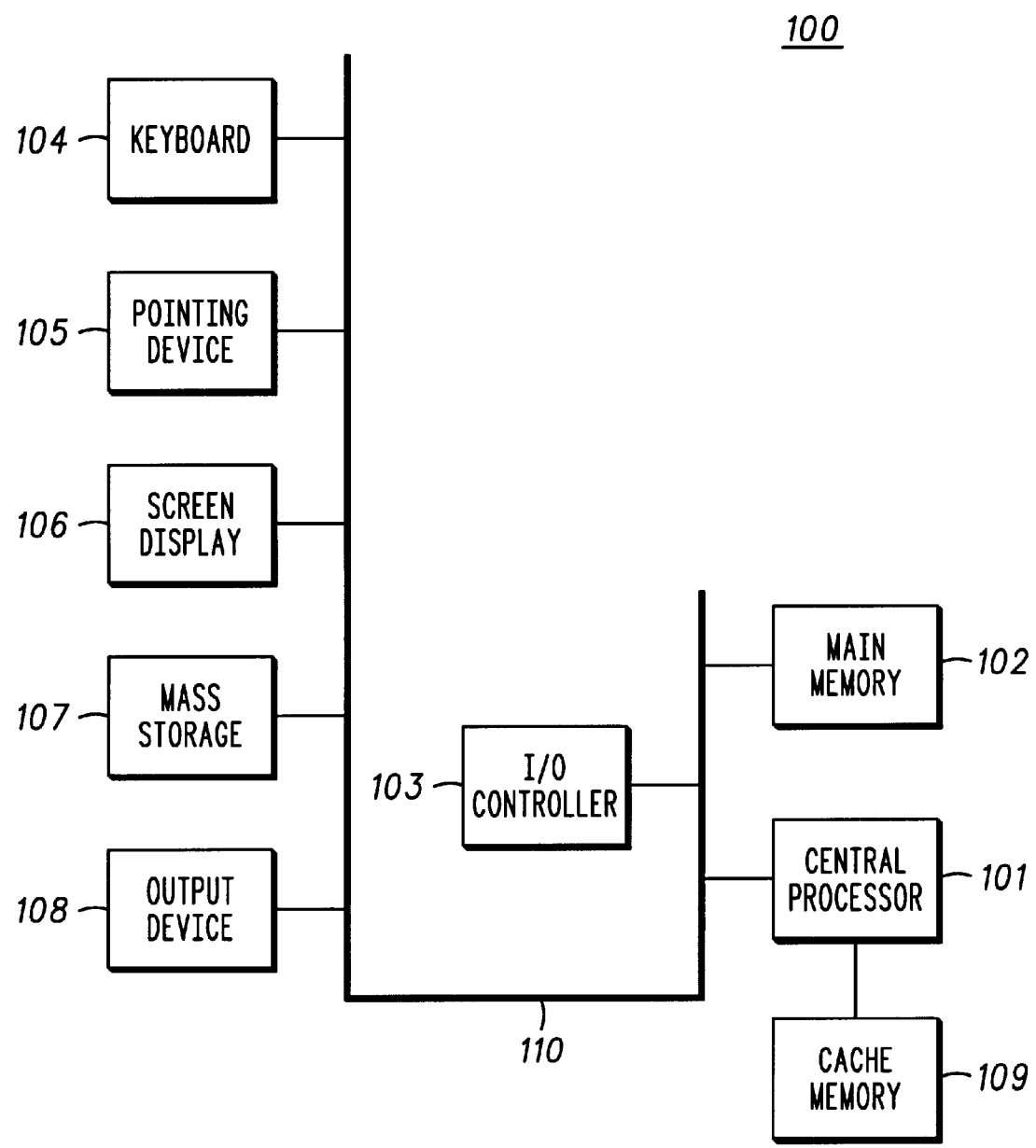
FIG. 1 is a block diagram illustrating a computer system in which the present invention may be embodied.

The invention may be embodied on a computer system such as the system 100 of FIG. 1, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 2:
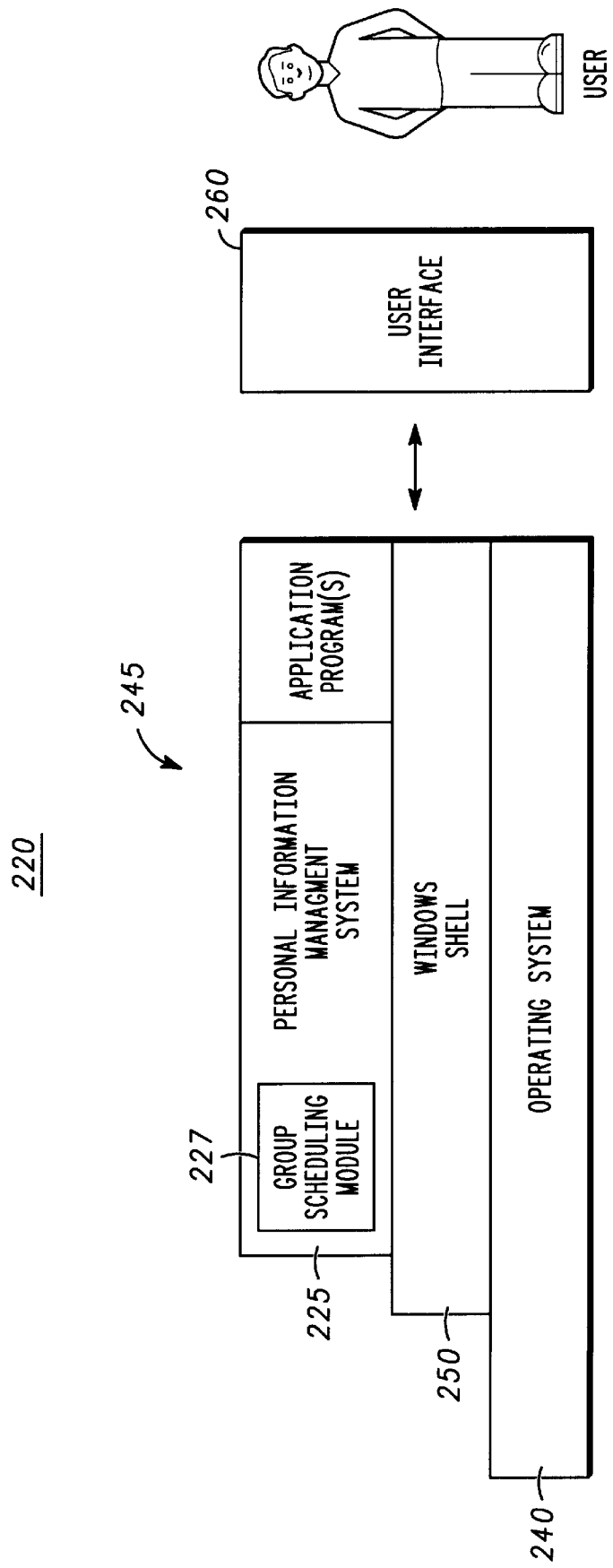
FIG. 2 is a block diagram of a computer software system for controlling the operation of the computer system of FIG. 1.

Illustrated in FIG. 2, a computer software system 220 is provided for directing the operation of the computer system 100. Software system 220, which is stored in system memory 102 and on storage (e.g., disk memory) 107, includes a kernel or operating system (OS) 240 and a windows shell 250. One or more application programs, such as client application software or "programs" 245 may be "loaded" (i.e., transferred from storage 107 into memory 102) for execution by the system 100.

System 220 includes a user interface (UI) 260, preferably a Graphical User Interface (GUI), for receiving user commands and data. These inputs, in turn, may be acted upon by the system 100 in accordance with instructions from operating module 240, windows 250, and/or client application module(s) 245. The UI 260 also serves to display the results of operation from the OS 240, windows 250, and application(s) 245, whereupon the user may supply additional inputs or terminate the session. OS 240 and windows 245 can be provided by Microsoft® Windows 95, by Microsoft® Windows NT, or by Microsoft® Windows 3.x (operating in conjunction with MS-DOS); these are available from Microsoft Corporation of Redmond, Wash. Alternatively, OS 240 and windows 245 can be provided by IBM OS/2 (available from IBM of Armonk, N.Y.) or Macintosh OS (available from Apple Computers of Cupertino, Calif.). Although shown conceptually as a separate module, the UI is typically provided by interaction of the application modules with the windows shell, both operating under OS 240.

One application software comprises an Internet Utilities System 225 which includes an Internet-based "Quick" marks subsystem 227 of the present invention. The The subsystem 227 manages preferred Internet sites for a user connected to a variety of communication services, including the Internet or to other commerical service providers (e.g., CompuServe). In an exemplary embodiment, System 225 comprises Starfish Internet Utilities™, which is available from Starfish Software, Inc. of Scotts Valley, Calif. A general description of the operation of Starfish Internet Utilities™ can be found in its accompanying user manual. Interface and methods provided by the "Quick" marks subsystem of the present invention, in the exemplary embodiment of Starfish Internet Utilities™, will now be described in further detail.

Methodology for Managing Preferred Internet Sites using "Quick" Marks

A. "Control Center" User Interface

In an exemplary embodiment, the Internet Utilities System 225 provides a Control Center for managing eight special utilities. The utilities are "plugged into" the Control Center, so that the user can rearrange them or "hide" ones that the user does not need. Using the Control Center, the user can start programs and a World Wide Web browser from the Control Center with just the click of a button or a keystroke; use a set of "virtual" screens to see which programs the user is working with, switching back and forth among them with a single click; launch multiple instances of an Internet browser, and then switch from one site to another; glance at a gauge or meter to instantly check how much memory and disk space are available on one's computer; and track the time spent online and monitor one's connections.

Plug-in utilities are the main features on the Control Center. In the currently-preferred embodiment, the Control Center interface includes a total of eight utilities: Quick-Marks™ (hereinafter referred to as Quick marks), InternetMeter, Virtual Screens, QuickZip, WinTools, Resources, InternetClock, and Printers. In addition, Quick-Run and a Taskbar are included. Because the Control Center is configurable, the user can "plug-in" these utilities to suit one's needs, from rearranging them to hiding them, to snapping off individual utilities. The Control Center itself can be vertical or horizontal, and can be docked to different sides of the screen or "float." If the user has checked the "Auto Hide" feature for the Control Center, the entire Control Center disappears from view unless the user moves the mouse cursor over it.

Figure 3A:
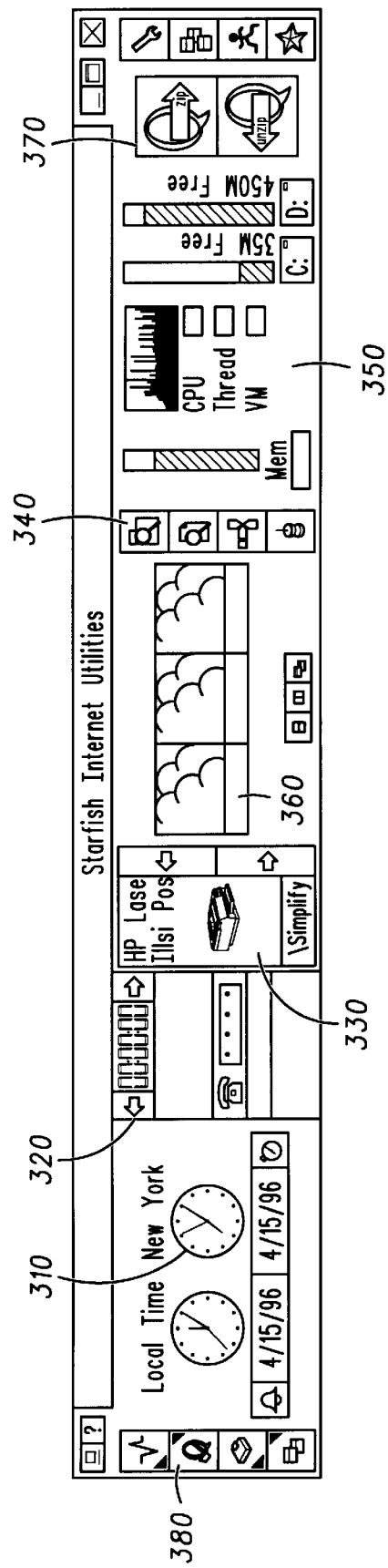
FIGS. 3A–B are bitmap screen shots illustrating a preferred interface provided by the system of the present invention.

FIG. 3A illustrates Control Center interface 300, in a default configuration. InternetClock 310 lets the user set alarms and adjust one's system time from an Internet time server. InternetMeter 320 tracks the user's online activity. The Printers utility 330 lets the user select any printer, and drag and drop to print documents. The WinTools utility 340 provides single-click access to frequently used tools like Find. The Resources utility 350 tracks the levels of system resources. The Virtual Screens utility 360 lets the user switch among applications quickly and easily. QuickZip utility 370 lets the user compress and extract files.

Figure 3B:
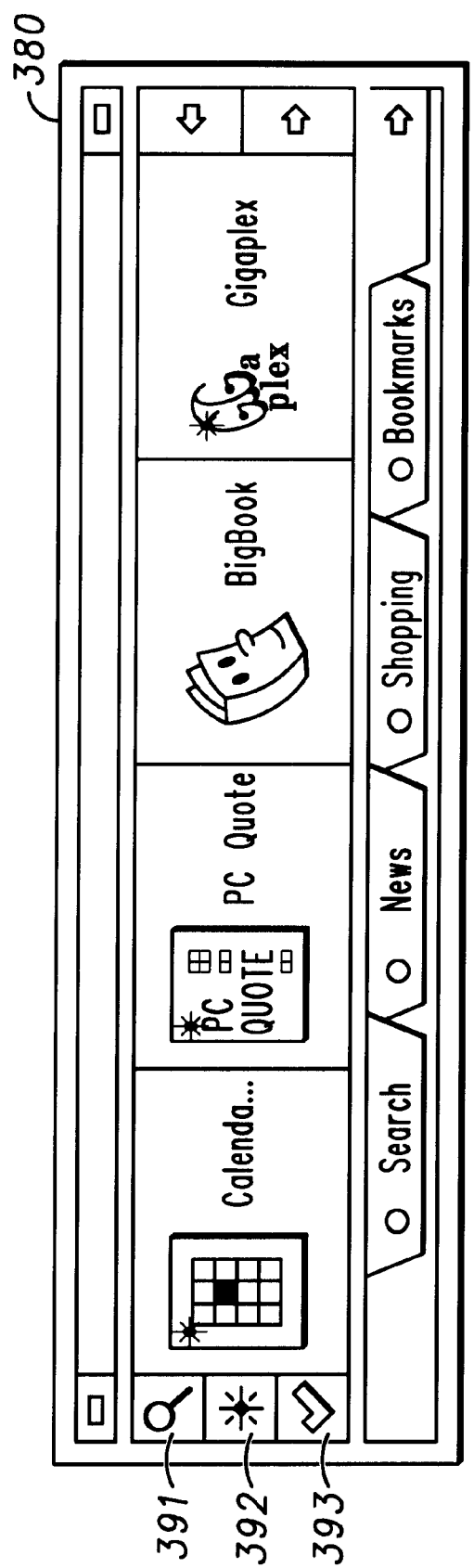

Of particular interest herein is the Quick marks utility 380, which is shown in FIG. 3B snapped off (e.g., for attachment to the screen bottom). This utility lets the user easily organize programs, Web sites, and other items in tabs, and start them with a single click. Its particular interface comprises a manageable lists of marks which is organized by tabs, folders, and visual icons. Buttons on the Quick marks utility let the user start programs or jump to a Web site. When the user clicks an Internet Quick marks button, the system launches the user's Web browser and connects the user to that Web site. After the browser is launched, the user can continue to click different Quick marks buttons to connect quickly to desired sites. In addition, the Quick marks utility contains three special buttons: Find Quick Mark 391, What's New 392, and Manage Quick Marks 393. These buttons are used to manage and search through one's programs, Internet sites, and documents.

Figure 4A:
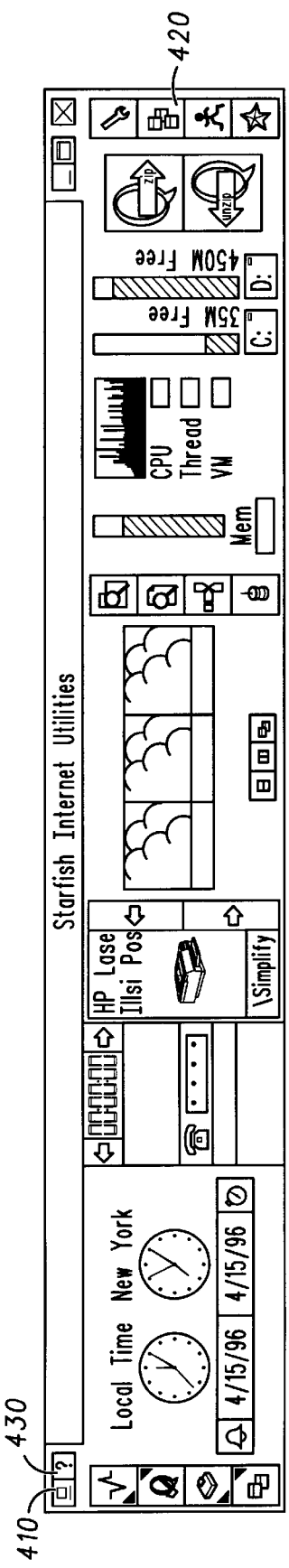
FIGS. 4A–B are bitmap screen shots illustrating various screen buttons provided by the user interface.

As shown in FIG. 4A, the Control Center interface provides three menu buttons to help the user work in the Windows environment. A System menu, accessible from button 410, lets the user access several Windows functions. A Layout menu, accessible from button 420, lets the user save the placement and size of applications in Virtual Screens and manage previously saved layouts. This allows the user to set an arrangement of open programs in the Virtual Screens. A Help menu, accessible from button 430, lets the user access the online Help.

Figure 4B:
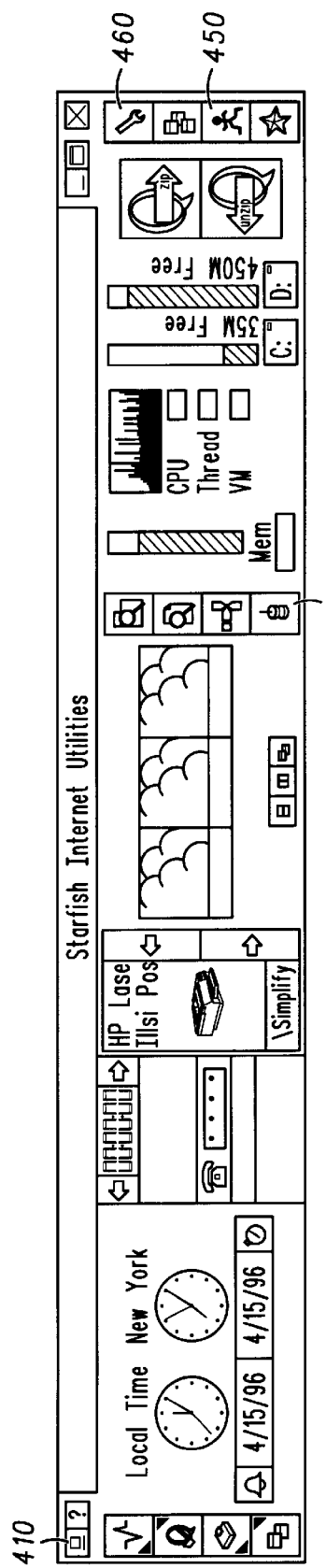

As illustrated in FIG. 4B, the Control Center includes buttons which let the user snap utilities on and off, access menus, open a Customize dialog box, and perform other functions. WinTools buttons 440 allow the user specify particular buttons that appear here. QuickRun button 450 displays a command line and a DOS command window from which the user can execute DOS and Windows 95 commands. Customize button 460 allows the user to customize the appearance and behavior of the Control Center itself by setting preferences. These are global settings that apply to the Control Center as a whole.

B. Overview of Utilities

The following provides a brief overview of each utility in the system. For complete information about each utility, see *Starfish Internet Utilities: User Manual* (*Chapter* 4), available from Starfish Software of Scotts Valley, Calif., the manual's disclosure of which is hereby incorporated by reference. The WinTools utility provides single-click access to the user's most-frequently used features of Windows 95. To choose the features that one works with all the time and display them on this utility, the user clicks the Customize button and selects "WinTools" from the Plug-Ins list. The Resources utility contains information about one's computer's memory, Windows system resources, and system environment. The user employs the Resources utility to examine resource usage and to set alarm levels for low resources. A Memory Watch displays the amount of free memory in kilobytes and graphically as a percentage. CPU shows how busy the computer's central processing unit is. Thread tells how many concurrent execution threads are operating. VM displays the number of Virtual Machines. Drive Watch displays available disk space for drives that the user specify.

The Printers utility lets the user change the default printer with a single click. In addition, it prints any document that is dragged to it. The Virtual Screens utility expands the applications workspace by providing multiple virtual desktops. The user can open programs on different Virtual Screens and then switch quickly and easily between them. In addition, the user can launch multiple instances of his or her Web/Internet browser, and then view one site while the browser in another Virtual Screen is connecting to another site. To start a program, the user drags the program to a Virtual Screen from a Quick marks button or the Explorer. When it is in full or medium mode, each Virtual Screen represents a full-screen view. To save space on the Control Center, the user can change to compact mode when he or she is finished working with the Virtual Screens. Each running program is shown as a mini window. When Virtual Screens are in compact mode, they are numbered. The QuickZip utility lets the user compress and uncompress files quickly and easily. The user can create .zip files and self-extracting files (.exe) just by dragging and dropping files onto the QuickZip utility.

The InternetMeter lets the user easily track his or her online communications that use 32-bit Windows 95 Internet browsers, such as Netscape Navigator 2.0, and almost all other 32-bit (Windows 95) applications. The user can monitor the status of dial-up modem connections or TCP/IP links. In addition, the Call Log lets the user analyze previous sessions and create reports, which can be sorted by provider, number, and time. The InternetClock includes reminders with pop-up messages, alarms that play a sound, and tasks that can start programs. The clocks can be displayed with different time zones, and even automatically adjusted to the user's system time by using the Internet. Clicking the Internet Time Synchronizer button automatically adjusts the system time by connecting to an Internet time server.

The Quick marks utility displays the user's most frequently used programs, Internet sites, documents, and utilities as buttons, which are grouped into tabs for easy access. Quick marks tabs organize the user's buttons by task, program, project, or Internet category. For example, the Quick marks utility includes predefined Internet tabs, such as Search, News, and Sports, with Internet buttons representing a variety of Web sites. Operation of the Quick marks utility will now be described in further detail.

C. Quick Marks Utility

The term "quick mark," as used herein, refers to any item in the Quick marks utility, from Internet sites to programs to documents. In typical operation, the Quick marks utility is set up by the user so that his or her most frequently-used quick marks are buttons, where the user can easily access them. The user can employ tabs to group these buttons by type, program, task, or project.

1. Starting a Program or cCnnecting with an Internet Site

Figure 5:
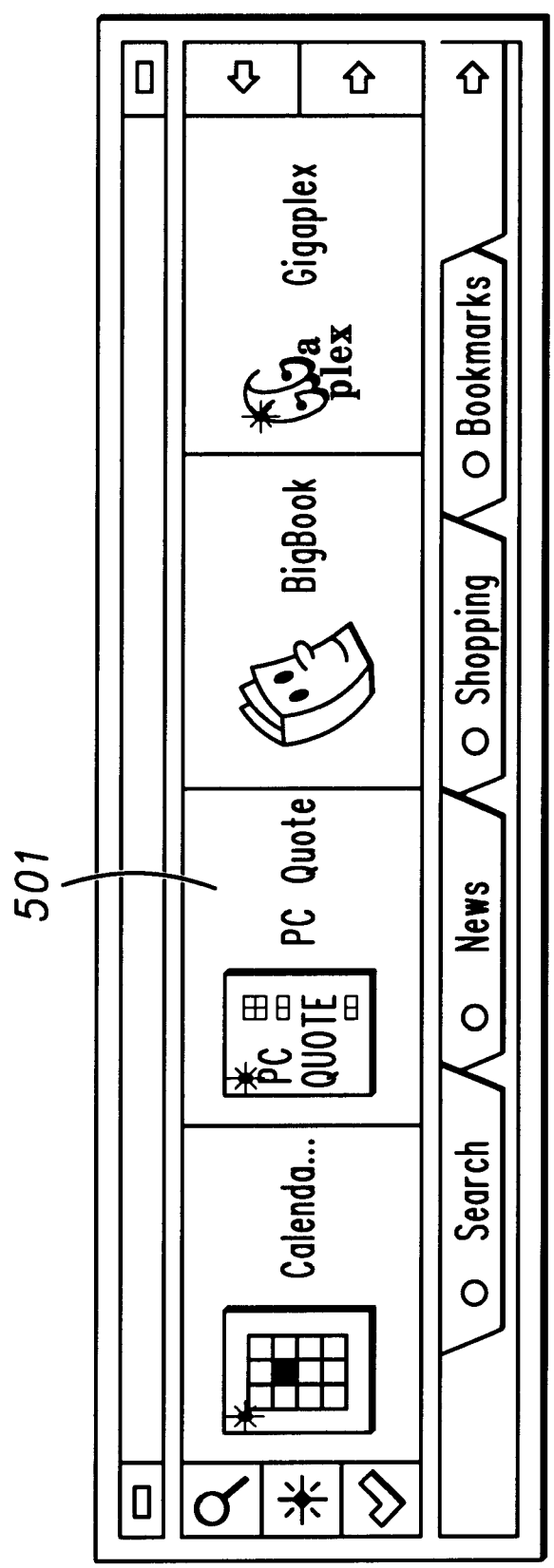
FIG. 5 is a bitmap screen shot illustrating organization of marks into different categories or folders.

To start a program or connect with an Internet site, the user selects (e.g., clicks) the program's or the site's Quick marks button. As illustrated in FIG. 5, to start a program or connect to a Web site, the user clicks its Quick marks button, such as button 501. If the item is an Internet site and the user's browser is not already running, clicking the button launches the browser automatically, which then connects directly to that site. After the browser is launched, the user can continue to click different Quick marks buttons to connect quickly to those sites.

When the user first runs the system, an AppOrganizer feature of the system searches for applications, and puts them into different groups, with a separate tab representing each group. The user drags a button to another tab to move it to a different group. The user can run the AppOrganizer at any time after installation (by selecting a Manage Quick marks menu). Use of the Manage Quick marks menu is described hereinbelow. In addition, the system creates a variety of Internet-related Quick marks tabs (such as Search and News), with six to ten Quick marks buttons in each category. The system also automatically imports and creates tabs for the user's Internet "Bookmarks," if the user's browser is Netscape Navigator, and/or "Favorites," if the user's browser is Microsoft Internet Explorer. Each time the user adds another Bookmark or Favorite, the system updates that Quick marks group for the user. The user can use the Quick mark shortcut menus to perform tasks such as creating a new folder in a selected tab, adding tabs, creating Quick marks buttons, and changing the properties of a Quick marks.

2. Tool Buttons

The Quick marks utility contains three tool buttons: Manage Quick marks, What's New, and Find Quick mark. The user can use these buttons to perform Quick marks tasks ranging from adding a new Quick marks tab, to finding an individual Quick marks item quickly, to seeing which Quick marks items have been updated. Operations supported by these buttons are now described.

a. Manage Quick Marks

Figure 6:
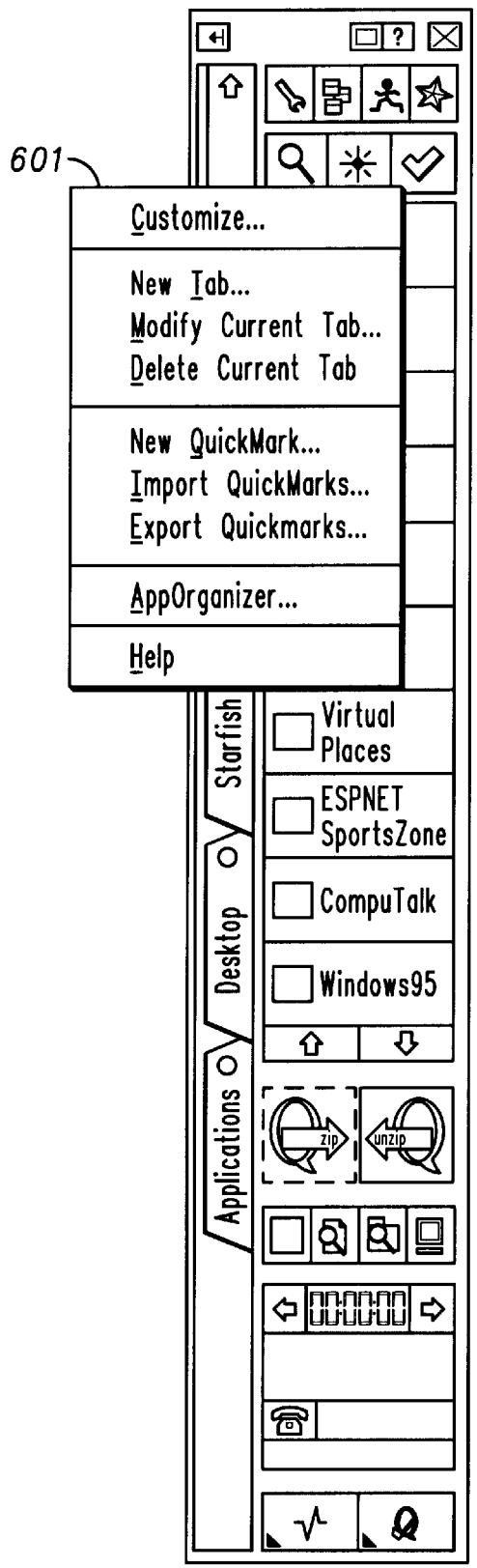
FIG. 6 is a bitmap screen shot illustrating management of marks, using a pop-up menu.

The user can add new tabs, add new Quick marks buttons, and even import and export Quick marks by clicking the Manage Quick marks tool button on the Control Center. When the user clicks the Manage Quick marks button, the Manage Quick marks menu 601 opens, as illustrated in FIG. 6. The user employs the Manage Quick marks menu to perform tasks ranging from adding tabs to saving sites in a special database format. From the menu, the user can select from the following options: New Tab, Modify Current Tab, Delete Current Tab, New Quick mark, Import Quick marks, Export Quick marks, and AppOrganizer. Each is explained in turn.

The "New Tab" choice adds a new Quick marks tab to the Control Center. Here, the user clicks "New Tab" and enters a name for the new tab, color if desired, and tab type in the dialog box. For the tab type, the user selects "Desktop Items" if the tab will represent Quick marks buttons representing items on the desktop, Recent Documents if it will represent the documents in the user's Windows 95 Start menu's Documents option, Navigator Bookmarks or Explorer Favorites if it will represent the user's Netscape Navigator or Internet Explorer bookmarks, and Quick mark Folder for all other types of items.

The "Modify Current Tab" choice lets the user change the currently selected tab's name or color. The "Delete Current Tab" choice removes the currently-selected tab from the Control Center.

"New Quick mark" adds a new Quick mark button to the currently selected tab. To do this, the user clicks "New Quick mark" on the menu and selects the item type (Application, Document, or Internet). In response, a Properties dialog box opens. Here, the user enter a title for the new Quick marks button and, if desired, a hot key for it. The user can also select a special icon for the button. If the user wants the button included in the notification process, the user selects a "Periodic Changes" box. If the item is an application, the user clicks the Application tab to enter the program name and directory. If it is an Internet site, the user clicks the Internet Site tab to view the site's last update and location. If it is a document, the user clicks the Document tab to enter its filename.

"Import Quick marks" adds new Quick marks items from a "Cool" marks database (stored as a .cmk file). This database contains useful and interesting Web sites and is included with the system. The user can also import .cmk files, for example, received from friends and colleagues. For example, suppose the user wants to add some sports-related Web sites. Here, the user clicks the "Import Quick marks" menu item. The Import Quick marks dialog box appears. Into the dialog, the user enters the desired file name, such as sample.cmk, and clicks "Open." A new tab and the Quick marks buttons in that file are added to the Control Center. To view the new Quick marks buttons, the user clicks that tab.

"Export Quick marks" saves a Quick marks folder in the "Cool" marks database format. For example, if the user has some entertaining World Wide Web sites, he or she might have them all in an "Online Fun" tab. Suppose that the user wants to e-mail them to a friend who also uses the system. The user proceeds by selecting the tab that he or she wants to export, and clicking the Export Quick marks menu item. Now, the user enters a name for the file, such as Fun, and a description. The user checks the Export Quick marks in Sub-Folders box to include any folders within that tab, and clicks "Export." Now, the user can choose the directory in which to save the "Cool" marks database (.cmk) file, and enter a name for that file. Now, the user clicks "Save" to save the file (optionally as a read-only .cmk file)

b. AppOrganizer

The AppOrganizer lets the user update the Quick marks utility after it has been installed. To run the AppOrganizer, the user clicks "AppOrganizer" on the menu. Now, the user check "Add Internet Sites" to import additional Internet sites into Quick marks. Internet Explorer and Netscape Navigator update the user's Favorites and Bookmarks automatically. By checking "Organize Installed Applications," the user instructs the AppOrganizer to organize the user's applications into Quick marks folders.

To view a list of the Quick marks items that have most recently been tagged as new or removed, the user clicks the "What's New" button. As illustrated in FIG. 7, the system periodically scans the user-specified Quick marks and displays a list of new and removed items. Updated items are marked with a starburst; removed items, such as a discontinued Web site, are marked with an X. The user can customize how frequently the system checks the user's Quick marks and whether the user is notified with an alarm when an item changes.

c. Finding Quick Marks

Figure 8:
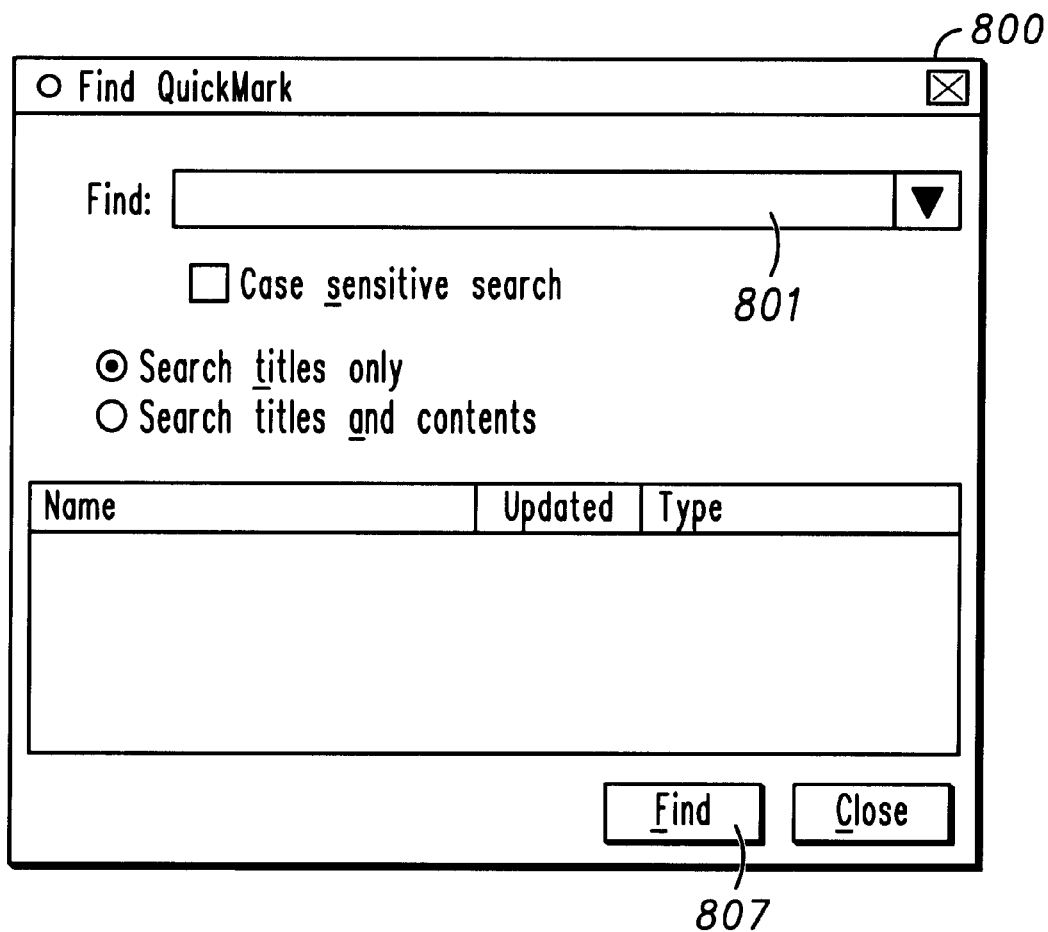
FIG. 8 is a bitmap screen shot illustrating a Find dialogue for searching or locating marks of interest.

To locate Quick marks item quickly, the user clicks the Find Quick mark button or selects Find Quick mark from the Quick marks shortcut menu. As illustrated in FIG. 8, the system displays a Find Quick marks dialog 800. Here, the user enters a word, a title, or a character, in edit field 801, to search on. Additionally, the user can specify one of many search options, including specifying that the search only include the title of items, that the search include both the title and content of items, or that the search is case insensitive. Upon the user clicking the Find button 807, the system starts the search.

d. Creating Quick Mark Buttons

To create a Quick marks button for a program or document, the user either: (1) drags a program file (such as Sidekick. exe) or a Windows 95 shortcut from the Explorer or a folder to the Quick marks utility; or (2) drags a document or data file (for example, Memos.doc) from the Explorer to the Quick marks utility. The file's extension is typically associated with the program.

To add an Internet Quick marks button, on the other hand, the user proceeds as follows. In the user's browser, the user right-clicks a Web site that he or she wants to save, and then selects "Internet Shortcut" from the pop-up menu. The user clicks OK in the Create Internet Shortcut dialog box. This method creates a shortcut, represented by an icon, which appears on the user's desktop and in the user's Quick marks Desktop group. Now, the user drags the shortcut to an appropriate Internet Quick marks group. For example, if the shortcut represents a site describing comedy films, the user could drag it to an Entertainment group. In addition, the user can use one of the following methods. With some versions of Microsoft Internet Explorer, the user can drag and drop the home page status icon at the bottom right of the Web page to a Quick marks group. With some versions of Netscape Navigator, the user can drag and drop the "chain link" icon at the top left of the Web page to a Quick marks group. Here, the user selects and then drags and drops an individual bitmap image, such as a .gif (CompuServe-defined GIF format) image, or hyperlink from a Web page to a Quick marks group.

e. Changing a Quick Mark's Button's Icon

Figure 9A:
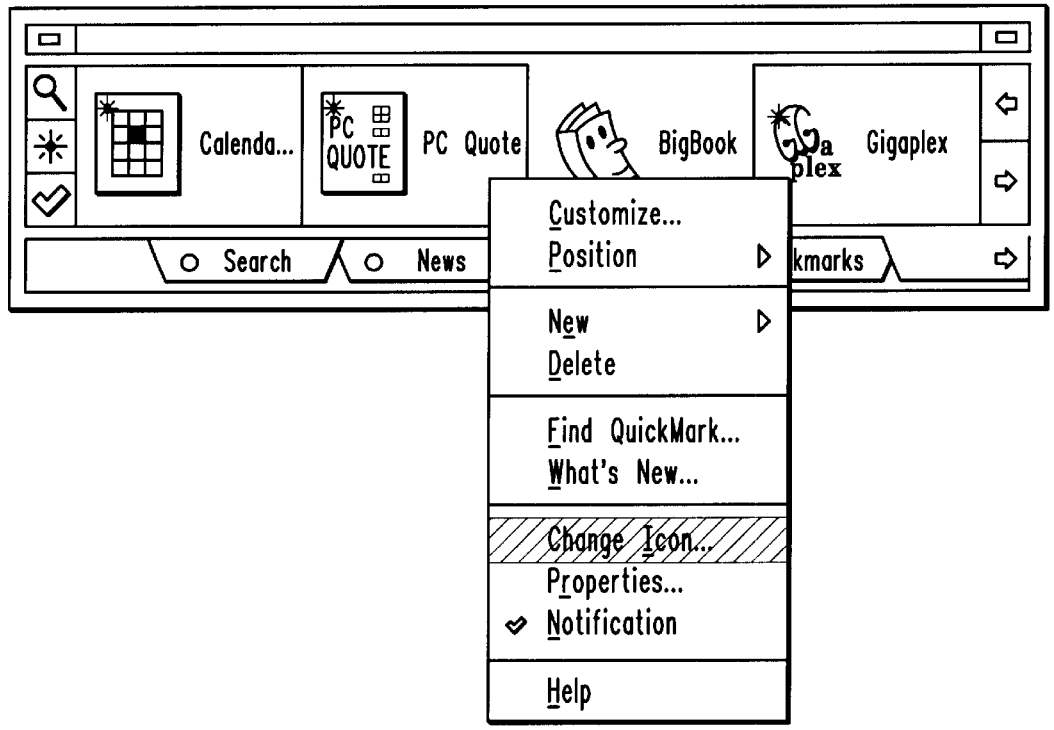
FIGS. 9A–B are bitmap screen shots illustrating use of the interface for changing a graphic image or icon associated with a particular mark.
Figure 9B:
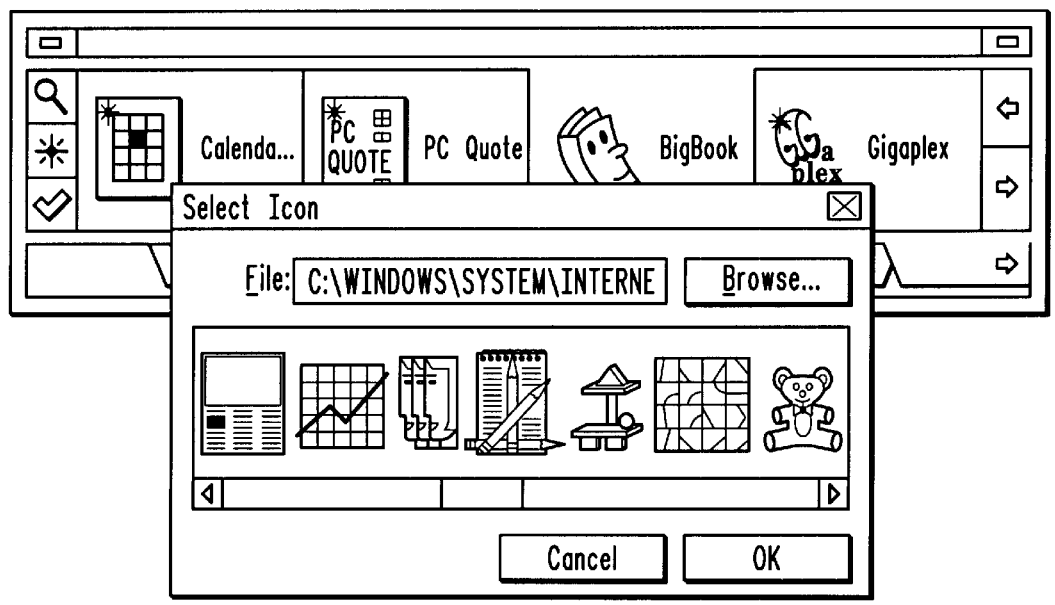

The system includes an Icon Gallery of colorful icons to assign to the user's Quick marks Internet buttons. To change the icon of a Quick mark's button, the user right-clicks the Quick marks button and selects "Change Icon," as illustrated in FIG. 9A. Now, the user selects an icon from a "Select Icon" dialog box, or clicks Browse, as illustrated in FIG. 9B. Here, the user can search for an appropriate graphic.

f. Starting a Program and Loading a File

The user can set up a Quick marks button to load a document or data file at the same time it starts the program. To set up a Quick marks button to load a data file, the user right-clicks the Quick marks button and clicks the Properties menu item on the shortcut menu. The user then clicks the "Application" tab. Now, the user can enter a program with (optional) parameters. For instance, the user can enter "C:\Windows\Pbrush.exe" in a Program field and enter "D:\Artwork\Picasso.pcx" in a Parameter field. If an association for the data file extension exists, the user need only enter the path to the data file. If a file name association exists, the user can instantly create a Quick marks button that loads a data file by dragging the data file name (for example, Memos.doc) from the Windows Explorer or a folder to the Quick marks utility. A hot key can be assigned for a Quick mark item, such as a program or a Web site, thereby letting the user launch it from the keyboard.

g. Quick Marks Preferences

Figure 10:
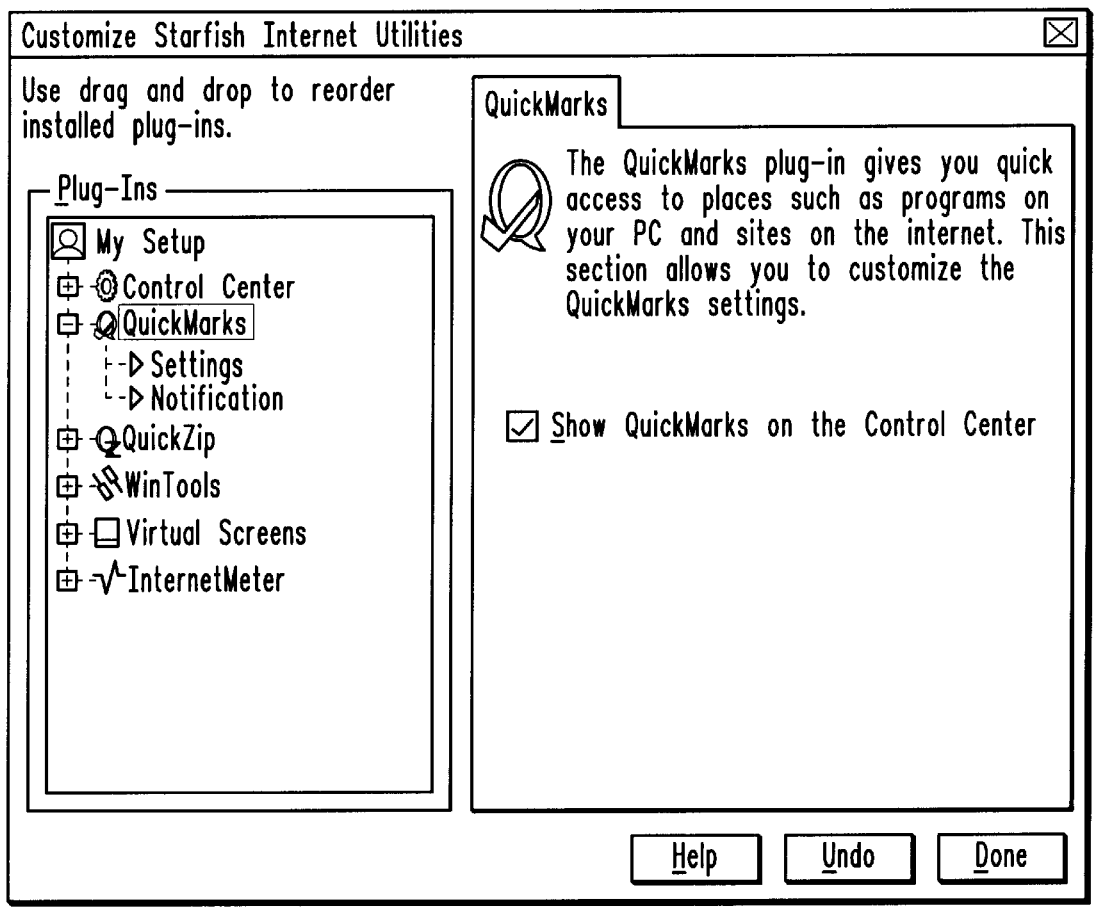
FIG. 10 is a bitmap screen shot illustrating an exemplary dialogue for customizing the user interface of the present invention.

By clicking the "Customize" button, the user can specify several different preferences for the Quick marks utility, as illustrated in FIG. 10. The user can instruct the system to display or hide the Quick marks utility. The user can specify button and icon styles. In addition, the user can change the interval for auto-saving his or her Quick marks. The user can change the position of the Quick marks utility and use auto hide for it, or display it always in front. The user clicks Auto hide to hide the utility from view when it is snapped off and docked. The Quick marks utility then appears only if the user moves the mouse cursor over it. By the user checking "Always in Front," the Quick marks utility will always be in front of other windows. The user can have the system periodically check the Quick marks and notify the user if any are updated or removed (such as a discontinued Internet site).

Internal Operation

A. Introduction

From a high level perspective, the previously-illustrated Control Center serves as the main interface of the system—arranging individual components for presentation to the user. The Control Center itself does not perform the work underlying the various components or utilities it presents to the user. Instead, the system is constructed so that each utility functions as a "plug-in" that plugs into the Control Center. The actual work underlying each utility or plug-in is performed by that utility, apart from its presentation to the user by the Control Center. This configurable panel system itself is described in detail, for example, in commonly owned, co-pending application Ser. No. 08/079,720, filed Jun. 18, 1993, now abandoned the disclosure of which is hereby incorporated by reference.

In a preferred embodiment, the Quick marks utility is provided as a "plug-in" for the Control Center. Those skilled in the art will also appreciate that the utility may be constructed as a standalone application, or an applet within a browser, or a Microsoft OLE (object linking and embedding) control, or the like.

The actual Quick marks plug-in includes user interface and memory management components, which may be implemented in a conventional manner. Of particular interest to the present invention is that component or subsystem which comprises an abstraction layer which operates in conjunction with various drivers. The abstraction layer provides an interface allowing applications to communicate with the system and request Quick mark services. The workhorse routines, on the other hand, are encapsulated within the various drivers. The particulars of a Quick mark item are handled by a Quick mark (QMX) driver, which provides an extension—driver-specific API—for handling the item. With this architecture, the particular details of handling a mark (i.e., whether it is a URL, whether it is a pointer to a file, whether it is a document, or the like) are abstracted to a level which removes or decouples it from the management of the mark.

B. Core Architecture

Figure 11A:
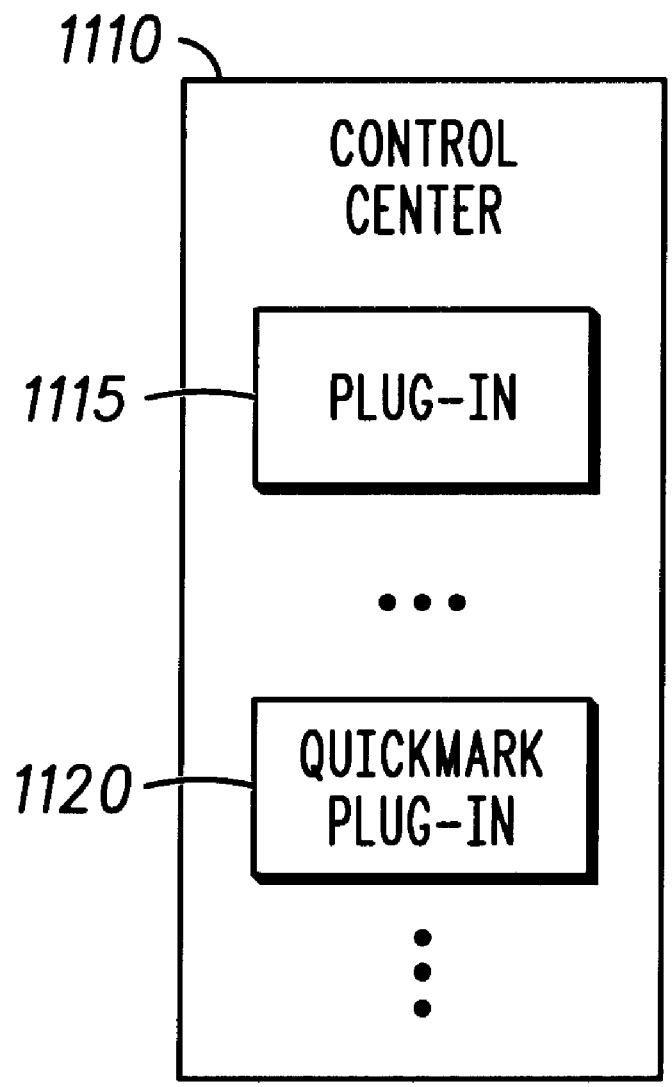
FIG. 11A is a block diagram illustrating basic structure underlying the "Control Center" user interface.

FIG. 11A illustrates a block diagram 1100 of the basic structure implementing the Quick marks functionality. As shown, the system includes Control Center 1110 having any number of "plug-in" modules, such as plug-in module 1115 and Quick mark plug-in module 1120. In this regard, the plug-in module 1120 is but one of many plug-in modules for the Control Center 1110.

Figure 11B:
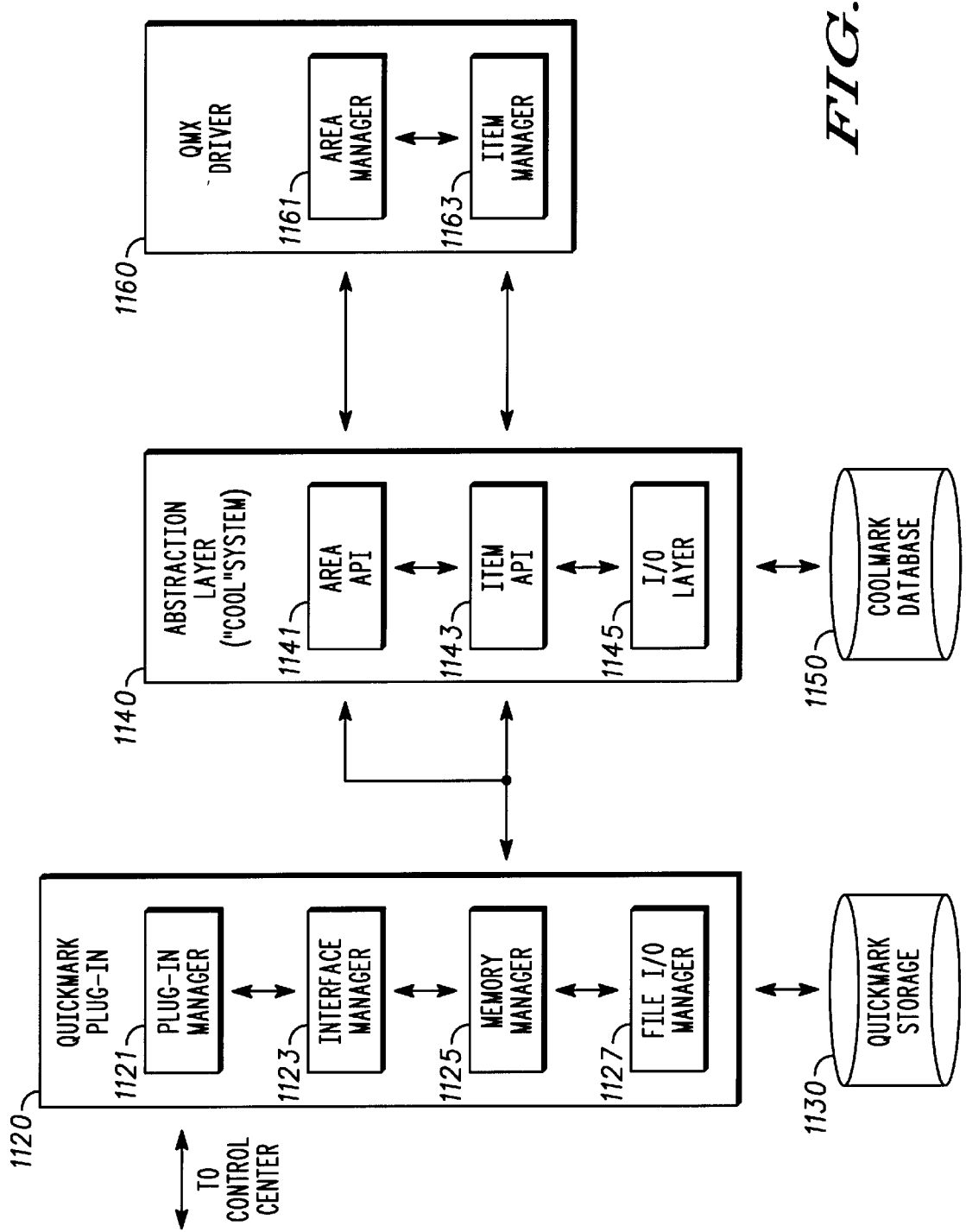
FIG. 11B is a block diagram illustrating basic structure of a plug-in, which provides improved management of marks in accordance with the present invention.

The Quick marks plug-in module 1120 is shown in further detail in FIG. 11B. As shown, the module 1120 includes a plug-in manager 1121, an interface manager 1123, a memory manager 1125, and a file input/output (I/O) manager 1127. The latter component interfaces directly with Quick mark storage (database) 1130. The plug-in module 1120 interfaces with the Control Center 1120 through plug-in manager 1121. The manager 1121 communicates with the Control Center 1110 via a panel-based API. Through the API, the plug-in module 1120 can publish its properties to the Control Center and can respond to events (e.g., "paint" message). Implementation of a panel-based API is described, for instance, in the Dashboard® SDK (Software Development Kit), provided in Borland C++4.5, available (Part No. BCP1245WW23681) from Borland International, Inc. of Scotts Valley, Calif.

The interface manager 1123 manages user interface elements, including windows (screens), dialogues, buttons and the like. This manager, therefore, controls user interface operation. The user interface elements themselves can be implemented in a conventional manner.

Memory manager 1125 provides memory management for the plug-in, largely by managing a linked list of objects. This module allows a mark to be abstracted into an item in the list of objects. The manager provides a list of containers and items. Containers can contain other containers (i.e., nested containers) and/or contain items. The items themselves may comprise "folders" and "areas." The two differ in that an area has a specific association with a driver. Imported Netscape bookmarks or imported Microsoft Internet Explorer Favorites each represent an area—that is, an item associated with a specific driver. In this manner, different areas can be established, each area having its own particular I/O handling provided by a driver specific for that area. Further, however, each area can contain folders, and each folder, in turn, can contain one or more marks.

The file I/O manager 1127 is a layer which facilitates storage of Quick mark information. In a preferred embodiment, the file I/O manager 1127 largely serves to simply stream in-memory structures out to a persistent storage device (and back again, when needed). In other words, this module is purposely designed to not examine or even care about the particular contents of a mark, so that the file I/O manager could operate in a generic manner (i.e., without tying its implementation to a particular proprietary data format). In this manner, the file I/O module 1127 is only concerned about the hierarchy of items, not the contents of particular items. The mark information itself is stored in the database 1130.

As shown in FIG. 11B, the plug-in 1120 communicates with a driver abstraction layer ("cool" system) 1140. The layer includes an area API 1141, an item API 1143, and an I/O layer ("cool" layer) 1145. The abstraction layer 1140 provides an API shell which allows the plug-in to communicate with a specific driver (e.g., driver 1160), together with I/O support. The area API 1141 is concerned with how the I/O for a particular area is handled, such as how to correctly handle Netscape bookmarks (which are stored in HTML format in a bookmark,htm file, which can be parsed and translated). At the level of the abstraction layer 1140, the area API is generic—that is, the same API is employed for different area types. Underlying the generic API, however, is specific implementation provided by the driver for correct processing of the specific type of area.

Item API 1143 provides an interface to a type of item. The item itself can be an application, a document, a URL (Web) site, and the like. Here, an item can be extended to support other proprietary items, such as America On Line "Favorite Places" and CompuServe "Go" sites. Each is different in the way it is handled particularly; nevertheless, all are the same in the sense that each serves as a pointer to an "item" which is activated upon user selection.

The "Cool" I/O layer 1145 manages storage of mark information in a "Cool" marks database 1150. The mark information being stored is similar to that stored at 1130. For the database 1150, however, the mark is stored in a different state. In general, each mark is stored in the database 1150 in a machine-independent format. At the same time, each mark is stored in the storage 1130 in a machine-specific format. Consider, for instance, storage of two marks: a URL and a file. Because of its universal nature, a URL is easily translated, regardless of which machine employs it; it simply points to a place on the Internet. What a "file" points to, on the other hand, changes from one computer to another. The file itself does not change. However, interpretation of the file changes from one computer to another. A cool mark for a file, as stored in the database 1150, is unresolved. For the Quick mark storage 1130, on the other hand, it is resolved (since it resides on a specific machine). The system provides a mechanism whereby a mark residing in the cool mark database 1150 can be translated into a corresponding mark in the Quick mark storage 1130. For translation of a "file" item, for instance, the system would resolve where the file is located on the specific machine. If a location is found, the system would augment or supplement the generic description with a specific description.

The I/O layer 1145 provides the interface into the database 1150. Like the corresponding I/O module 1127, the I/O layer 1145 does not attempt to interpret the contents of that which it stores. Instead, the layer simply manages storage for a hierarchy of items. Translation of the specific data is left to the drivers. Since it operates in a generic manner, the I/O layer can provide I/O services which are common to all marks.

The driver 1160, as shown in particular detail in the figure, comprises two sections: area manager 1161 and item manager 1163. The area manager 1161 provides specific implementation support for areas. Although a single area manager is shown, each driver can include multiple area managers, if needed, for supporting different types of areas. In a similar manner, the item manager 1163 provides specific implementation support for items. As with areas, multiple item managers can be sponsored by each driver, for supporting different types of items.

C. "Item" Data Structure

In an exemplary embodiment, each "item" may be constructed from an "item" record, defined as follows.

```
typedef struct    // (QMITEM) QuickMark item
{
WORD          wType;                        // item type
WORD          wFlags;                       // item flags
DWORD         dwMarkID;                     // unique mark ID
DWORD         dwTypeID;                     // item handler ID
DWORD         dwSize;                       // item data size
DWORD         dwTime;                       // update time stamp
WORD          wHotkey;                      // activation hot key
LPVOID        pData;                        // pointer to data area
HICON         hIcon;                        // item icon handle
char          sTitle[MAX_QMARKTITLE];       // folder title
} QMITEM, FAR* LPQMITEM;
```

This structure, which stores a Quick Mark item, resides in the memory management layer of the plug-in. The structure is useful to study as it represents the abstraction of a mark to a generic representation.

The structure includes the following members. As its first member, the structure stores a type, wType, which serves as a unique identifier for the kind or type of mark. The next parameter, wFlags, stores housekeeping information, including read-only properties for the mark.

The next parameter stores a mark ID, dwMarkID. Every item represented in the system is uniquely identified with an ID. This identifier (e.g., time stamp or counter-incremented value) is assigned on-the-fly. The type ID, dwTypeID, is also unique but is assigned or defined by the handler. This is how the system identifies which driver is to handle the mark. Each driver, in turn, sponsors a list of type ID's which it supports. ID's are defined, for instance, for a type of "file," "URL," and the like. The next data item, dwSize, is the size of the data specific to that item. In combination with the size, the structure also stores a pointer to the data area (actual data) for the mark, pData. With these two data members, the system can perform several generic operations on a mark (e.g., storing the mark to disk).

The time data member, dwTime, stores a time stamp indicating when the mark was last updated (or created). The "hot key" data member, wHotkey, allows the system to assign a "hot key" or activation key for the item. The icon data member, hIcon, stores a reference or handle to an icon resource, so that each item can be associated with a particular icon. Additionally, each mark can have a title, stored by the sTitle field.

Collectively, these fields provides a generic representation of each mark: only the generic attributes of the mark (e.g., size and title) are stored. Proprietary information about the mark is not represented by this structure.

D. Drivers

Figure 12:
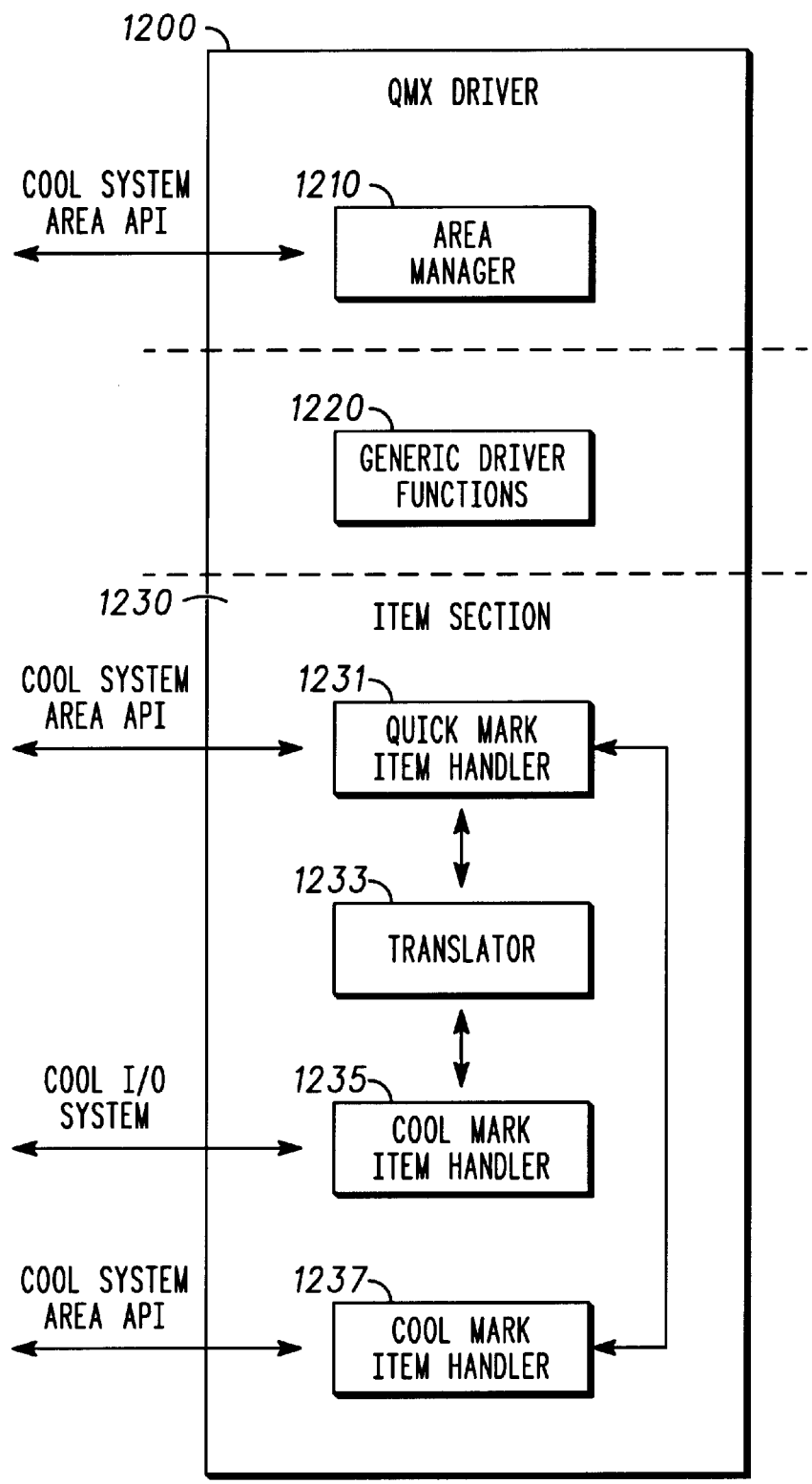
FIG. 12 is a block diagram illustrating basic structure of a driver, which operates in conjunction with the plug-in of FIG. 11B.

FIG. 12 is a block diagram illustrating basic architecture of a driver 1200. As shown, the driver includes an area manager 1210, generic driver functions 1220, together with item-specific section or modules 1230. The item-specific section 1230 of the driver includes an item handler 1231, a translator 1233, a second item handler 1235, and a Microsoft OLE translator 1237.

The area manager 1210 is concerned with the specific management of an area, whether it is a Netscape "bookmark" area or a Microsoft Internet "favorite" area. It functions to add and remove folders, add and remove items, and provide synchronization. In essence, the area manager 1210 serves as a storage mechanism. An item can be, for instance, writeable, readable, and/or read-only. If an item is writeable, for instance, the user can employ the area manager 1210 to add or remove a folder in that area (e.g., adding a folder to Netscape bookmarks), as well as adding or removing an item (e.g., adding or removing a particular mark). The synchronization function maps the item to an external data structure. For instance, a Netscape bookmarks area synchronizes with the actual bookmarks of the Netscape Navigator Browser. Here, the synchronization function translates the specific Netscape HTML bookmark file to the actual Quick mark structure for that area. In a similar manner, the synchronization function for a driver supporting Microsoft Internet Explorer provides translation from the Microsoft "favorites" format to the Quick mark structure. In essence, synchronization serves as an import/export facility for converting marks to and from proprietary formats into the generic mark data structure. In an exemplary embodiment, synchronization is "live" during system operation. Here, the system monitors the target marks so that when an item is added to the target (e.g., Internet Explorer), the system, in response, re-imports the mark.

The generic driver functions 1220, on the other hand, provide generic functions, such as the name or ID of the item (e.g., Internet item, program item, and the like), enumeration of how many areas are handled (e.g., Netscape bookmarks, Microsoft Internet Explorer favorites and the like), and enumeration of items. The enumeration of items specifically indicates what kinds of items the driver supports. When enumerating different items, the generic driver functions 1220 will furnish a type ID together with a name. Once a type ID is established for a mark, that ID is employed for subsequent function calls. When specifically calling through the "Cool" API, the caller provides the type ID together with a pointer to the data for the mark. Through the type ID, the system can resolve which implementation steps to use for carrying out requested functionality for a mark.

The item section 1230 of the driver includes item handlers. Each item handler is concerned with how the system correctly processes an item type (e.g., Internet item or file item). The first item handler 1231 serves as the Quick mark item handler. Recall that two types of items exist, a "Quick" mark local to the computer and a "Cool" mark which represents a universal version of the mark. Information about translating from one version to another is encapsulated within the item region or section 1230 of the driver. As shown in FIG. 12, the "Quick" mark item 1231 can translate the mark into a "Cool" mark by use of the translator 1233. In a complimentary manner, the "Cool" mark item handler 1235 can translate its mark into a "Quick" mark, again using the translator 1233. Through the driver, therefore, the system can easily switch back and forth between the two item types, supporting actions on either (or both) the "Quick" mark item or the "Cool" mark item.

The following function, for instance, translates from an Internet "Cool" mark (machine independent) to an Internet Quick mark (local to the users machine).

```
//------------------------------------------------
//------------------------------------------------
LPVOID FAR PASCAL IXItemFromCool( UINT iType, LPVOID pCool,
LPSTR pFile, LPCDBITEMINFO pInfo )
    {
    SYSTEMTIME      stm;
    FILETIME        ftm;
    WORD            wDate;
    WORD            wTime;
    // get time
    GetSystemTime( &stm );
    SystemTimeToFileTime( &stm, &ftm );
    FileTimeToDosDateTime( &ftm, &wDate, &wTime );
    switch ( iType )
        {
        case ITEM_TYPE_URL:
            {
            LPURLITEM   pItem;
            if ( (pItem = HeapAlloc( GetProcessHeap(),
    HEAP_ZERO_MEMORY, sizeof (URLITEM) )) == NULL
                    return( NULL );
            IXInitItemData( iType, pItem );
            pItem = SetURLLocation( pItem,
    ((LPURLCOOL)pCool)->sLocation );
            pInfo->dwTypeID = URL_ID;
            pInfo->dwSize    = GetURLItemSize( pItem );
            pInfo->dTime     = (DWORD)MAKELONG
    (wTime,wDate);
            return( pItem );
            }
        }
    return( NULL );
    }
```

In a complementary manner, the following function is the reverse of the above. It exports an Internet Quick mark back to an Internet Cool mark.

```
//----------------------------------------------
//----------------------------------------------
LPVOID FAR PASCAL IXItemFromCool( UINT iType, LPVOID pItem,
LPDWORD pdwSize )
        {
        switch ( iType )
                {
                case ITEM_TYPE_URL:
                        {
                        LPURLCOOL    pCool;
                        LPSTR              pText;
                        // allocate new cool
                        if ( (pCool = HeapAlloc( GetProcessHeap(),
HEAP_ZERO_MEMORY, sizeof(URLCOOL) ) ) == NULL )
                                return ( NULL );
                        // build new file cool
                        memset( pCool, 0, sizeof(URLCOOL) );
                        if ( (pText = GetURLLocation( pItem )) )
                                1strcpyn( pCool->sLocation, pText,
MAX_URLPATH-1 ); if ( pdwSize )
                                *pdwSize = sizeof(URLCOOL);
                        return( pCool );
                        }
                }
        return ( NULL );
        }
```

Exemplary actions for a "Cool" mark item include initialization, comparison, and property-based operations. The initialize operation initializes a new "Cool" mark, including initializing a record which contains the appropriate information for characterizing the mark. Comparison operations allow the system to compare one "Cool" mark against another, for investigating similarities or resolving conflicts. The property-based operations allow the handler to edit properties of a mark. Actual editing of the properties is preferably done in conjunction with a "Cool" mark editor, which allows one to create a "Cool" mark database directly with the property section of the item handler supporting this dialogue.

The item section 1230 supports a similar set of services, implemented for a "Quick" mark. Specifically, initialization, comparison, and property-based operations are provided, which function in an analogous manner to that described for item handler 1235. In addition to these, however, the item handler 1230 supports user-oriented functions including searching for a mark (i.e., searching for content), opening (launching) a mark, and verifying a mark (confirming its integrity). Finally, the fourth module in the item section, OLE translator 1237, is an optional mechanism which translates between "quick" mark format and OLE object "clipboard" format.

Illustration of driver functionality is perhaps best described by way of example, using a GetItemProps API call. Although the function represents a specific implementation, it is perhaps best viewed as a template for how most functions in the item and area API work. The function is invoked upon a user action requesting editing of a mark's properties, such as changing the title of the mark changing the URL address, or the like. The memory management layer isolates which item the user has requested the properties for. From this item, the memory manager isolates the particular data structure, including information about size, type ID, and other generic data members. This information, in turn, is passed to the "Cool" system for invoking the GetItemProps function.

In an exemplary embodiment, the function may be constructed as follows.

```
// Typical CoolMark AFI function to QMX driver function
//----------------------------------------------
// QMxGetItemProps ()
//
// Retrieves the contents of an item configuration
// page.
//
// Parameters:
//         dwID - item type identifier
//         hDlg - handle to item configuration page
//                created by QMXOpenItemPage()
//         iPage - item page index
//         pData - pointer to item data area to fill
// Returns:
//         size of data area required to hold page
//         configuration.
//
// NOTE: The data pointer pData can be NULL, in
// which case this function simply returns the
// required size. If an item has multiple pages,
// the total required data size is the sum of all
// values returned by successive calls to this
// function for each page.
//----------------------------------------------
DWORD FAR PASCAL QMXGetItemProps( DWORD dwID, HWND
hDlg, UINT iPage, LPVOID pData )
        {
        LPQMI pQMI;
        // seek item from ID
        if ( (pQMI = SeekQMXItem( dwID )) )
                {
                // check capability
                if ( ! (pQMI->dwFlags & QMI_ITEMSETUP) )
                        return( 0 );
                // get config data
                if ( PQMI->pIXGetItemProps )
                        return( (*pQMI->pIXGetItemProps) (hDlg,
pQMI->iType,iPage,pData) );
                }
        // failure. . .
        return( 0 );
        }
```

As shown, the API function is invoked with four parameters. The first parameter, dwID, is the type ID or identifier (previously described), identifying which driver to employ. The second parameter, hDlg, is a handle to a dialogue (Microsoft Windows standard data structure), for identifying the dialogue (user interface component) for displaying properties. The third parameter, iPage, identifies the particular page (in a multi-paged dialogue); it serves housekeeping purposes. The final parameter, pData, is a pointer to the actual items data.

At the outset, the method invokes a subroutine call, SeekQMXItem. Given a unique ID, the subroutine call will return the particular driver which is appropriate for handling the item type. The method will then proceed to call through the driver. A virtual table (v-table) mechanism is employed to associate specific functions in the driver with the action requested. Before this is done, however, the method first tests whether the capability is supported by the driver, by testing the driver flags. After calling through the virtual table, using the same parameters which were initially passed, the method returns a result code of zero, in the event that the call failed. This basic architecture is repeated throughout the area and item API calls. In particular, each call includes resolving a particular handler in the driver, based on a passed-in item type (ID). At that point, it is up to the specific implementation to handle the service being requested by the client.

E. Notification

As previously illustrated (for the user interface), the user can instruct the system to "notify" the user when content for the marks (or other content of interest) has changed. In the currently preferred embodiment, the user specifies a notification interval, for indicating how often the user desires to be notified. Items which have changed are indicated to the user in the previously-described "What's New" interface. Here, any content identified as new during the notification verification process will be shown to the user in this section.

A difficulty with the task of notifying a user of an item which is new is determining whether in fact the item is actually new—specifically, whether content of interest to the user has changed. Although HTTP protocol includes a service for allowing a server to indicate when content has changed, commonly this "last update" information is set equal to the current time as the last update, for indicating that the system is "always" updated. Such an approach is not useful for the user, however.

According to the present invention, an approach to overcoming this problem is to look at the actual content itself, rather than relying on the HTTP header. For a meaningful comparison, a reference is required to the prior version. Since storing a local copy of prior versions would require a substantial amount of storage space, the preferred approach is to instead apply a checksum for detecting a change to content.

Applying a checksum in and of itself is not a particularly useful indicator of content change for HTML-based forms, though. Of interest is not whether the HTML content changed, but whether it changed in an interesting way (i.e., in a way relevant to the user). Items which are not of interest, for instance, include items which are constantly cycling, such as advertisements or bulletins which continually change. A checksum approach, if it did not take into account this changing "uninteresting" material, would not fare much better than the HTTP-header checking approach, since the content being checked would always be identified as new. What is needed, therefore, is an approach having the ability to figure out what content is interesting to the user.

An HTML document or form comprises two components: text and markup (HTML formatting codes). In accordance with the present invention, a "selective checksum" is employed. Specifically, a checksum is derived from the interesting text, while ignoring markups, thereby yielding a reliable indicator of whether information of interest to the user has changed.

A simple checksum can be constructed by simply adding all the units together which comprise the content of interest, such as adding together all of the byte values for the characters of the text portion of the body of an HTML document. The end result or sum is a machine word. Thus the approach allows the summation process to overflow or wrap around as necessary. Nevertheless, the result yields a unique number ranging from 0 to 65,535. If content has changed in the item, such as an HTML document, it is highly unlikely that an identical checksum would result. In a preferred embodiment, the value of zero is reserved for representing an unitialized checksum value. In the event that the checksum of an item does yield zero, a ones complement operation is performed for converting the zero value to a non-zero value.

In an exemplary embodiment, a VerifyURL function may be constructed as follows, for instance, for verifying a URL.

```
 1: //------------------------------------------------
 2: // Verification process specific to the Internet
 3: // item QuickMark type. Verifies the item, updates
 4: // any bulletins text in the item and returns with
 5: // the verification state (new/same/bad) and the
 6: // verification time.
 7: //------------------------------------------------
 8: LPURLITEM VerifyURL( LPURLITEM pURL, LPDWORD pTime,
    LPUINT pResult )
 9: {
10:   char     sBulletin[MAX_BULLETIN];
11:   LPSTR    pLocation;
12:   LPSTR    pAddress;
13:   LPSTR    pData;
14:   UINT     iSocket;
15:   UINT     iHostType;
16:   DWORD    dwTime;
17:   WORD     wChecksum;
18:   BOOL     bVerify;
19:   int      iCode;
20:
21:
22: //
23: // This retrieves the URL address from the Internet QuickMark
24: // item (i.e. http://bogus.com/index.html) since the Internet
    QuickMark
25: // storage mechanism is not a consistently sized structure.
26: //
27:
28: // get location from URL item
29: if ( (pLocation = GetURLLocation( pURL )) == NULL )
30:     {
31:     pURL->wChecksum = 0;
32:     *pResult = ITEM_VERIFY_BAD;
33:     return( pURL );
34:     }
35:
36: // allocate a temporary buffer for the URL address
37: if ( (pAddress = CopyString( pLocation )) == NULL )
38:     {
39:     pURL->wChecksum = 0;
40:     *pResult = ITEM_VERIFY BAD;
41:     return( pURL );
42:     }
43:
44: //
45: // This is the verification loop which, given a URL address, attempts
46: // to read the HTML at the address and perform a checksum on the
47: // content. This loop will process a re-direction notification and
48: // continue to pursue verification at the new address until either
49: // a successful verification happens or a failed address is
    encountered.
50: //
51:
52: // ping/verify loop
53: do   {
54:      // open socket
55:      if((iSocket = SocketOpen(pAddress,&iHostType)) ==
    SOCKET_ERROR)
56:          {
57:          HeapFree( GetProcessHeap(), 0, pAddress );
58:          *pResult = ITEM_VERIFY_BAD;
59:          return( pURL );
60:          }
61:
62:          // read in buffer at socket
63:          if ( (pData = SocketRead( iSocket )) == NULL )
64:              {
65:              HeapFree( GetProcessHeap(), 0, pAddress );
66:              *pResult = ITEM_VERIFY_BAD;
67:              SocketClose( iSocket );
68:              return( pURL );
69:              }
70:
71:          // done reading data
72:          HeapFree( Get,ProcessHeap(), 0, pAddress );
73:          SocketClose( isocket );
74:
75: //
```

-continued

```
76: // Example implementations for HTTP and HTML.
77: //
78:            // if not HTTP, return
79:            if ( iHostType ! = SOCKET_HOST_HTTP )
80:              {
81:              // treat as unchanged
82:              HeapFree( GetProcessHeap(), 0, pData );
83:              bVerify = TRUE;
84:              dwTime = *pTime;
85:              wChecksum = pURL->wChecksum;
86:              break;
87:              }
88:
89: //
90: // This part finds out if we got a re-direction message instead
91: // of the HTML we wanted
92: //
93:
94:            // process return code
95:            memset( sBulletin, 0, MAX_BULLETIN );
96:            pLocation = CheckHTML( pData,&iCode,sBulletin, MAX_BULLETIN-1 );
97:
98:
99: //
100: // This part handles the return result which could be ok, re-direction,
101: // or some other problem. In the case of re-direction, we restart the
102: // process on the new address. In the case of ok, we call VerifyHTML
103: // and get back a checksum and an optional bulletin.
104: //
105:
106:           // check for relocation and verify
107:           if ( icode >= 100 && icode <= 199 )
108:             {
109:             // information, treat as OK
110:             HeapFree( GetProcessHeap(), 0, pData );
111:             bVerify = TRUE;
112:             dTime = *pTime;
113:             wChecksum = pURL->wChecksum;
114:             }
115:           else
116:           if ( iCode >= 200 && iCode <= 299 )
117:             {
118:             // return code OK, verify the data
119:             bVerify = VerifyHTML(pData, sBulletin, &dWTime, &wChecksum);
120:             HeapFree( GetProcessHeap(), 0, pData );
121:             }
122:           else
123:           if ( iCode >= 300 && iCode <= 399 && pLocation )
124:             {
125:             // allocate a temporary buffer for the relocation address
126:             if ( (pAddress = CopyString( pLocation )) )
127:               {
128:               HeapFree( GetProcessHeap(), 0, pData );
129:               // NULL terminate any CRLF
130:               if ( (pData = FindInString( pAddress, '\r' )) )
131:                 *pData = 0;
132:               if ( (pData = FindInString( pAddress, '\n' )) )
133:                 *pData = 0;
134:               // continue with re-located URL
135:               continue;
136:               }
137:             // failure. . .
138:             HeapFree( GetProcessHeap(), 0, pData );
139:             bVerify = FALSE;
140:             dWTime = GimmeTimeNow();
141:             wChecksum = pURL->wChecksum;
142:             }
143:           else
144:             {
145:             // error, treat as bad
146:             HeapFree( GetProcessHeap(), 0, pData );
147:             bVerify = FALSE;
148:             dwTime = GimmeTimeNow();
149:             wChecksum = pURL->wChecksum;
150:             }
151:
152:           // continue if relocation. . .
153: } while( icode >= 300 && icode <= 399 );
154:
155: //
156: // We're largely done. At this point we just continue with
157: // house keeping which involves writing our bulletin text back to the
158: // Internet QuickMark item record and dealing with the checksum result.
159: //
160:
161:           // update bulletin, if any
162:           if ( *sBulletin )
163:             {
164:             if ((pAddress=(LPVOID)SetURLBulletin( pURL, sBulletin )) == NULL)
165:               {
166:               *pResult = ITEM_VERIFY_OK;
167:               return( pURL );
168:               }
169:             pURL = (LPURLITEM)pAddress;
170:             }
171:
172: // handle failed verification
173: if ( !bVerify )
174:     {
175:     *pResult = ITEM_VERIFY_BAD;
176:     return( pURL );
177:     }
178:
179: //
180: // If we have no time stamp reported to us from the verification process,
181: // we assume the update time to be the verification time.
182: //
183:
184: // handle case where we don't have a time stamp
185: if ( dwTime == 0 )
186:     dwTime = GimmeTimeNow();
187:
188: //
189: // By comparing the returned checksum with the checksum stored in
190: // the QuickMark we can determine if the HTML site changed and is
thus "new."
191: // Here we flag it as new and record the new checksum and time.
192: // NOTE: there is one exception and that is the case where the
193: // old checksum we are comparing against is zero. This condition
194: // means that the Internet QuickMark has never been verified and we
195: // have no basis for comparison. In this situation we initialize
196: // the checksum for a future comparison but do not flag the item as
197: // newer.
198: // anything changed?
199: if ( wChecksum != pURL->wChecksum )
200:     (
201:     // record change
202: *pResult=(pURL->wChecksum==0) ? (ITEM_VERIFY_OK):
(ITEM_VERIFY_NEWER);
203:     *pTime = dwTime;
204:     pURL->wChecksum = wChecksum;
205:     return( pURL );
206:     }
207:
208: // nothing new
209: *pResult = ITEM_VERIFY_OK;
210: return( pURL );
211: }
```

(Line numbers added to aid in the following description.)

As shown, the first parameter passed into the function or method is a pointer to a URL item, pURL, for referencing a specific Quick mark item. Interpretation of this item is left to the driver, since this function is within the context of the driver (which understands the format of the URL item). The second parameter is a pointer to a double word (DWORD), for receiving the determined update time. The final or third parameter is a pointer to a result. The result returned is one of the following: new, same, or bad.

In addition to returning a result via the third parameter, the function also returns a result of type LPURL item—a pointer to an item structure (which can be different from that which was passed in initially). The verification process is at liberty to modify and/or re-allocate the item data structure which was passed in.

The function or method operates as follows. At lines 28–34, the method "cracks" out the location from the URL item. Here, the method invokes a subroutine call to a cracker function, GetURLLocation, for returning a pointer to a location text string. If the location cannot be successfully cracked from the URL item, the method sets a status flag (line 32) and returns (line 33). Otherwise, the method allocates a temporary buffer into which it stores a local copy of the URL location or address.

At line 53, the method establishes a do/while loop. This loop tests the validity of the URL address which has been copied into the local buffer. Because items can be relocated on the Internet, the URL address may return, instead of HTML content, a new HTML address or error code. Rather than performing a checksum on the error code, the method instead traverses all forward links until the actual destination of interest (i.e., the HTML page having the content of interest) is reached. To this end, the do/while loop attempts to open the communication socket until it reaches a final destination. Anytime the loop encounters a re-direction, it replaces the address in the local buffer with a new address (i.e., the one for the new location) and thereafter repeats the loop for another iteration.

The individual steps of the do/while loop are as follows. At lines 55–60, the method attempts to open the communication socket, by invoking a SocketOpen function (line 55). At lines 62–69, the method reads the buffer at the socket by invoking a SocketRead function and returns (at line 68) if no data is present in the buffer to read. If the call to SocketRead is successful, on the other hand, the method stores a pointer to that data in a local variable, pData. After the method is done reading the data, it performs housekeeping by freeing up the local buffer storing the address (line 72) and closes the communication socket (line 73). At line 79, the method examines the type of the host. Of interest to the method are Web pages (i.e., HostType=HTTP). If the host type is not HTTP, the method treats the content as unchanged (lines 81–86). Those skilled in the art will appreciate that analogous steps can be added for other host types which are of interest (e.g., file transfer protocol or "FTP").

The method now determines whether a re-direction message was received instead of HTML, at lines 94–96. Beginning at line 106, the method sets forth a series of if/else tests for checking for re-direction or, in the case of no re-direction, verifying the HTML data. The actual call to verify the HTML data, VerifyHTML, occurs for instance at line 119. This call to verify the HTML data derives the actual checksum. In the case of relocation, on the other hand, the method copies the string for the new location into the local address buffer, as shown for instance at line 126. After preparing the address string (lines 130–133), the method executes a "continue" statement, at line 135, for repeating another iteration of the do/while loop.

After completion of the do/while loop, the method has either verified target data (including running a checksum on that data) or has returned an error code. At lines 161–170, the method fills out any bulletin text string information (received from the URL). At lines 172–177, the method tests whether the verification process failed (for any of a number of reasons), by examining a "verify" Boolean flag. If the verification failed, the method returns, at line 176. Lines 180–186 simply sets the time stamp field to the current time in the event that the time stamp was not set during processing of the do/while loop.

At line 199, the method specifically checks the currently-computed checksum against the previous checksum for the Quick mark. Note, however, that this comparison is not performed for instances where the old checksum is zero. This condition indicates that the Quick mark has never been verified and, thus, does not provide a basis for comparison. In such a case, the method initializes the checksum for future comparison but does not flag the current item under exam as newer. After the checksum and time stamp fields are updated (lines 203–204), the method returns (line 205). Otherwise (i.e., the checksum has not changed), the method proceeds to lines 208–210 for setting the result data member to VERIFY_OK and, thereafter, returns (with a return value of the pointer to URL item).

The VerifyHTML method, which is invoked by VerifyURL, may be constructed as follows.

```
 1:
 2: //-----------------------------------------
 3: // VerifyHTML
 4: //
 5: // Scans HTML text pointed to by pHTML and returns
 6: // with checksum of only valid text portions of
 7: // HTML document (i.e. ignoring references to links,
 8: // graphics, applets etc.) Text at pBulletin is
 9: // updated if a title tag is encountered.
10: //-----------------------------------------
11: BOOL VerifyHTML( LPSTR pHTML, LPSTR pBulletin,
12:     LPDWORD pTime, LPWORD pChecksum )
13:   {
14: LPSTR pTag;
15: WORD wChecksum;
16:
17: // reset
18: wChecksum = 0;
19: pTime = 0;
20:
21: //
22: // First we scan by jumping tag-to-tag for the start of
23: // the actual HTML body (which is what we are interested in),
24: // paying attention to any TITLE tag which may supply
25: // text for our bulletin.
26: //
27:
28: // find HTML header
29: do          {
30:             // get next tag
31:             if ( (pTag = SeekHTMLTag( pHTML )) == NULL )
32:                  return( FALSE );
33:             if ( (pHTML = SeekHTMLTagEnd( pTag )) == NULL )
34:                  return( FALSE );
35:
36:             // process special tags ("bulletin")
37:             if ( CheckHTMLTag( pTag, "TITLE" ) )
38:                  CopyToNextTag( pBulletin, pHTML,
                            MAX_BULLETIN-1 );
39:
40:             } while( CheckHTMLTag( pTag, "BODY" ) ==
                 FALSE );
41:
42: //
43: // Now we again scan tag-to-tag, computing a simple checksum of
44: // all text which falls outside of the tags. We terminate when we
45: // hit an end of body tag or the HTML stream ends. The checksum is
46: // twos-complemented prior to exit to ensure that a non-zero
47: // checksum is returned even for blank HTML content.
48: //
49:
50: // continue until HTML end tag
```

-continued

```
51: do         {
52:            // get checksum to tag
53:            wChecksum += ChecksumToTag( pHTML );
54:
55:            // get next tag
56:            if ( (pTag = SeekHTMLTag( pHTML )) == NULL )
57:              {
58:                *pChecksum = wChecksum ^ 0xffff;
59:                return( TRUE );
60:              }
61:            if ( (pHTML = SeekHTMLTagEnd( pTag )) == NULL )
62:              {
63:                *pChecksum = wChecksum ^ 0xffff;
64:                return( TRUE );
65:              }
66:
67:            // continue until body end. . .
68:            } while( CheckHTMLTag( pTag, "/BODY" ) ==
               FALSE );
69:
70: // done
71: *pChecksum = wChecksum ^ 0xffff;
72: return( TRUE );
73: }
```

As shown by the method's parameters, the information read from the communications socket during execution of the VerifyURL method is passed to the VerifyHTML method. At lines 17–19, the method initializes or resets the checksum and time stamp (e.g., by setting each equal to the value of zero). At line 29, a do/while loop is established for hopping or jumping from HTML tag to HTML tag, paying particular attention to any TITLE tag which is encountered. The top of an HTML document typically comprises a header section followed by a body. Generally, the method is less interested in text in the header, as that often includes changing text which is not really of interest to the user. What really is of interest to the user is change to content in the body of the HTML form. The approach adopted, therefore, is to hop from tag to tag until a region of interest (i.e., BODY tag) is encountered. During this hopping process, if a tag is encountered representing a TITLE, the method copies the text of the title, for appending it to the bulletin. Upon completion of the do/while loop, the method will have arrived at the body of the HTML (if any).

Upon reaching the body, the method undertakes the core verification process for determining whether HTML content of interest has changed. At line 51, another do/well loop is established. This loop adopts an approach similar to that of the prior loop—jumping from one HTML tag to another. For this second loop, however, the method continues to jump among tags until it encounters a tag indicating the end of the HTML body. As the method jumps from tag to tag, it performs a checksum on the content following each tag, by invoking a SeekHTMLTagEnd method (at line 61). By not performing the checksum on the tags themselves, the method avoids the hypertext markup information. In this manner, the method can confine its checksum operation to the content itself. Accordingly, the method uncovers changes to the text content of the HTML document, without distraction from changes which are irrelevant to the user (e.g., changing bitmap of a rotating advertisement). After completing the verification process of this second do/well loop, the method concludes by returning the computed checksum (by storing it into the last parameter which is passed by reference).

F. "Cool" I/O System with On-the-fly Compression/decompression

Figure 13:
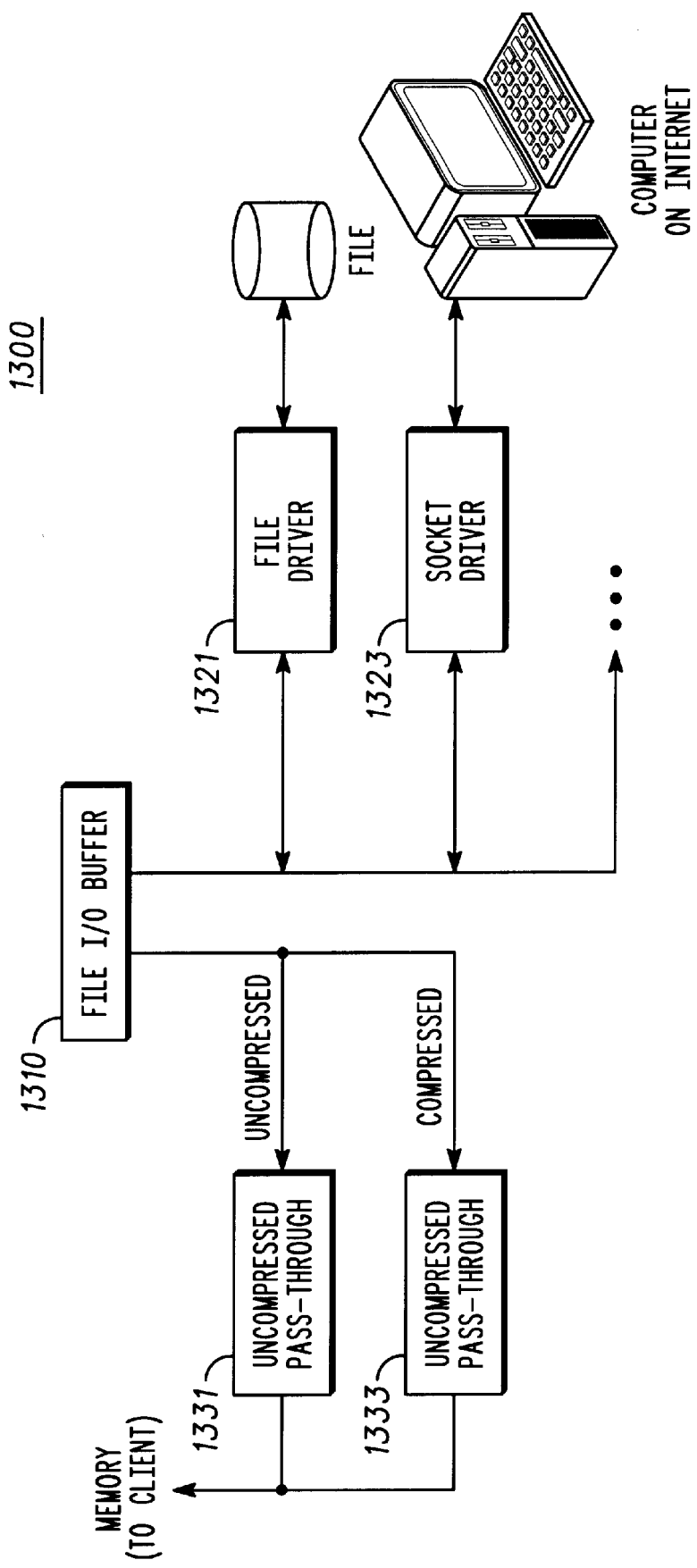
FIG. 13 is a block diagram illustrating an input/output (I/O) streaming system employed in the system of the present invention.

FIG. 13 is a block diagram illustrating a preferred "Cool" I/O (input/output) streaming system 1300 employed in the system of the present invention. Since I/O operations need to be performed on a variety of different sources (including a local file or a remote Web site), a system is required which is generic in nature. The streaming system 1300 includes a file I/O middle layer or buffer 1310 which stores the information in memory, together with specific drivers for each I/O technique (e.g., file driver 1321 for communicating with a disk file, and socket driver 1323 for communicating with a computer on the Internet). Each driver, in essence, serves to read bytes in for its particular source into the buffer 1310.

As it resides in the buffer 1310, the data itself can be compressed or uncompressed. For compressed data, compressor/decompressor module 1333 provides on-the-fly compression/compression, in a manner which is transparent to the client. In the instance that the data read into the buffer is not compressed, that data stream is simply passed to the client directly (i.e., without decompression), as indicated by uncompressed, pass-through module 1331.

Internally, each individual stream is characterized by a context descriptor, FILESTREAM. In an exemplary embodiment, the FILESTREAM data structure may be constructed as follows.

```
typedef struct
{
HFILE      hFile;          // handle to file
UINT       iSocket;        // socket
UINT       iIOMode;        // I/O mode
UINT       iIOType;        // I/O type
UINT       iCompression;   // compression mode
LPBYTE     pIOBuffer;      // pointer to I/O buffer
LPBYTE     pXBuffer;       // pointer to compression buffer
DWORD      dwIOBytes;      // current count of bytes in I/O buffer
DWORD      dwXBytes;       // current count of bytes in compression
buffer
DWORD      dwPosition;     // uncompressed file position
} FILESTREAM, FAR* LPFILESTREAM;
```

The data members function as follows. The first data member, hFile, stores a handle to a file (corresponding to a file handle, if any, supplied by the operating system). The second data member, iSocket, stores a handle to the socket identified with the stream (if any). The third parameter indicates a mode, such as "reading" and/or writing. The fourth parameter indicates a type—whether the stream is a file type, stream type, or the like.

The fifth field, iCompression, indicates a compression mode, for specifying a preferred compression methodology or that no compression is applied. In an exemplary embodiment, compression supported is preferably zero-packing, which strips out all unfilled information (i.e., compressing runs of zero bits). The next two data members, pIOBuffer and pXBuffer, store pointers or references to source (I/O buffer) and target buffers for compression/decompression. In conjunction with these fields, the structure stores a current count of bytes in the I/O buffer as well as a current count of bytes in the compression buffer. Finally, the structure stores a position, dwPosition, indicating the current uncompressed file position.

An exemplary method for opening a stream, IOOpen, may be constructed as follows.

```
I/O System
//----------------------------------------------
//----------------------------------------------
LPFILESTREAM IOOpen( LPSTR sFile, UINT iType, UINT iMode )
    {
    LPFILESTREAM    pFile;
//
// This section initializes the FILESTREAM structure for read/write and
// the type of target (file or socket stream). Compression always starts
// off. Later, it is up to the caller to turn a compression mode on by
// calling IOCompressStart() at a particular point in the file stream.
    // allocate file stream and buffer
    if ( (pFile
        = (LPFILESTREAM)HeapAlloc( GetProcessHeap(),
HEAP_ZERO_MEMORY, sizeof(FILESTREAM) )) )
        {
        pFile->iIOMode      = iMode;
        pFile->iIOType      = iType;
        pFile->iCompression = IO_COMP_NONE;
// This just calls the appropriate method to open the file stream for either
// a file or a socket.
//
        if ( (pFile->pIOBuffer
            = (LPBYTE)HeapAlloc( GetProcessHeap(),
HEAP_ZERO_MEMORY, SIZE_IOBUFFER )) )
            {
            // attempt to open the file
            switch ( pFile->iIOType )
                {
                case IO_TYPE_FILE:
                    if ( _FileOpen( sFile, pFile, iMode ) )
                        return( pFile );
                    break;
                case IO_TYPE_SOCKET:
                    if ( _SocketOpen( sFile, pFile, iMode ) )
                        return( pFile );
                    break;
                }
//
// Clean up from here on
//
            // free I/O buffer
            HeapFree( GetProcessHeap(), 0, pFile->pIOBuffer );
            }
        // free file stream structure
        HeapFree( GetProcessHeap(), 0, pFile );
        }
    return( NULL );
    }
```

The method is invoked with a text string of the file or URL item, together with a type and mode (as described above). At the outset, the method initializes a FILESTREAM structure (described above), using the passed-in mode and type.

Now, the method proceeds to call the appropriate method which opens the stream for either a file type or a socket type (or other defined type, supported by a provided driver). Afterwards, the method performs cleanup, by freeing up the previously-allocated I/O buffer. Thereafter, the method concludes.

Reading of the I/O stream is illustrated by the following method, IORead.

```
//----------------------------------------------
//----------------------------------------------
DWORD IORead( LPFILESTREAM pFile, LPBYTE pData, DWORD
dwBytes )
    {
    switch ( pFile->iCompression )
        {
        case IO_COMP_NONE:
            return( _DirectRead( pFile, pData, dwBytes ) );
```

-continued
```
        case IO_COMP_PACKED:
            return( _PackedRead( pFile, pData, dwBytes ) );
        }
    return( 0 );
    }
```

As shown, the file stream structure is passed in together with a pointer to a destination buffer and a number of bytes to read. The method, in turn, examines the compression type for the stream, applying on-the-fly decompression, as needed, before copying a byte stream to the indicated destination.

For uncompressed data, the method calls _DirectRead, which may be implemented as follows.

```
//----------------------------------------------
//----------------------------------------------
DWORD _DirectRead( LPFILESTREAM pFile, LPBYTE pData,
DWORD dwBytes )
    {
    return( _ReadBytes( pFile, pData, dwBytes ) );
    }
```

As shown, the method is a wrapper function for another method, _ReadBytes. This function simply serves to pass the bytes directly through without decompression.

For compressed data, on the other hand, the IORead method invokes _PackedRead. This method may be implemented as follows.

```
//----------------------------------------------
//----------------------------------------------
DWORD _PackedRead( LPFILESTREAM pFile, LPBYTE pData,
DWORD dwBytes )
    {
    DWORD dwRead;
    DWORD dwTotal;
    BYTE bCode;
//
// This is the main read loop. We read until we have satisfied the
requested
// number of bytes or we run into trouble.
//
    // reset
    dwTotal = 0;
    // read and decompress
    while ( dwBytes )
        {
/*
Here we check to see if we have any raw compressed bytes in the buffer.
If we do not, we need to call ReadBytes to re-fill the buffer from the file.
First we read the marker byte which tells us whether we have a run of
zeros of a particular length or whether we have a stream of bytes of a
particular length (between 1 and 128). If it is a zero run, we fill the buffer
with the
appropriate number of zeros. If it is a literal run, we read the rest of
the
bytes into the buffer.
*/
        // decompress into buffer
        if ( pFile->dwXBytes == 0 )
            {
            if ( _ReadBytes( pFile, &bCode, 1 ) == 1 )
                {
                dwRead = (DWORD) (bcode & 0x7f) + 1;
                if ( bCode & 0x80 )
                    {
                    memset( pFile->pxBuffer, 0, dwRead );
                    pFile->dwXBytes = dwRead;
                    }
                else
                    if ( _ReadBytes( pFile, pFile->pxBuffer, dwRead
                        == dwRead )
                        pFile->dwxBytes = dwRead;
                    }
```

-continued

```
        }
//
// The rest is house keeping. We copy the uncompressed results to the caller's
// buffer and make sure our file pointers are current.
//
        // check for error condition
        if ( (dwRead = min( dwBytes, pFile->dwXBytes )) == 0 )
            break;
        // copy from uncompressed buffer
        if ( pData )
        {
            memcpy( pData, pFile->pXBuffer, dwRead );
            pData += dwRead;
        }
        memcpy( pFile->pXBuffer, pFile->pXBuffer+dwRead,
pFile->dwXBytes-dwRead );
        pFile->dwXBytes -= dwRead;
        dwBytes -= dwRead;
        dwTotal += dwRead;
    }
    // return with total
    return( dwTotal );
}
```

For Internet applications, one cannot guarantee if and when particular bytes from a stream will be received. It is not uncommon, for instance, to receive a stream of bytes from an Internet connection as a "trickle"—a few bytes at a time. The approach adopted by the method is, therefore, to decompress the bytes as they are received.

G. Reverse Date Sorted Storage

Figure 14:
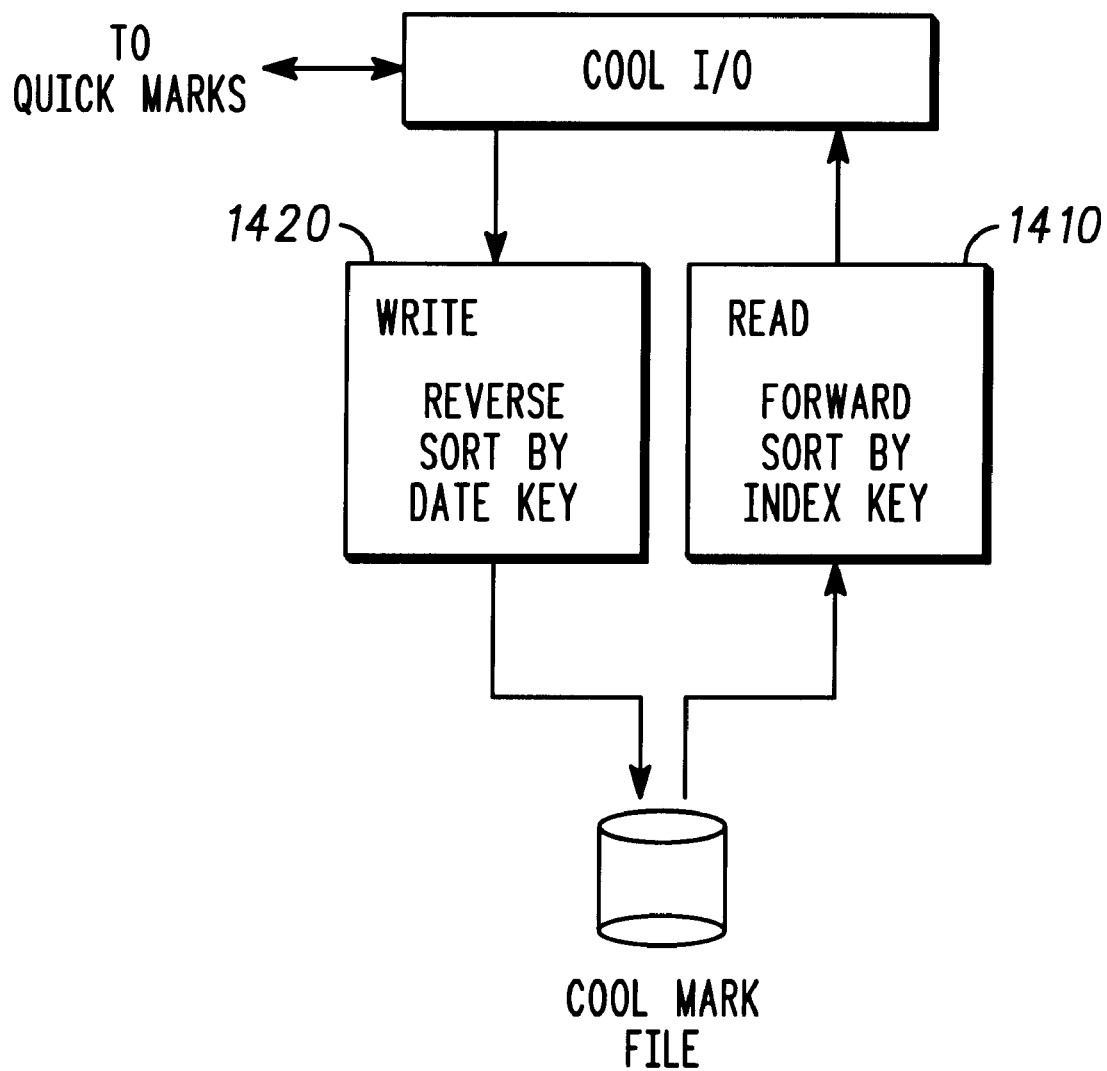
FIG. 14 is a block diagram illustrating reverse date-sorted storage methodology of the present invention, for remote storage of time-sensitive information.

A particular disadvantage of HTTP is its limited I/O capability. To access a random location in an HTML document, for instance, a browser cannot simply seek into a specific location and read a portion thereof Instead, the browser must scan the entire file. Consider a set of marks stored in a database which are of interest to the user according to each mark's age. As illustrated in FIG. 14, the approach adopted by the present invention, therefore, is to sort the data on a key field or index (e.g., date) as the data records are read into memory (as indicated by read module 1410). As the records are stored back in the mark database, however, they are written in reverse order (i.e., descending sort on date), as indicated at 1420. On a subsequent retrieval, as data is loaded from the database (which can reside on a remote system), only those first several records need to be read which satisfy the user criteria or what's new. By using reverse date sorting for HTTP data, therefore, the system can more efficiently retrieve information which is of interest.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having at least one browser for accessing content from on-line sites, an improved method for managing marks representing on-line sites of interest to a user, said marks including marks proprietary for at least one particular type of browser, the method comprising:

receiving a request from the user for storing a particular mark from a given browser, said particular mark having a format proprietary to a particular browser and referencing a particular on-line site of interest;

storing, in response to said request, first information characterizing machine-independent attributes of the particular mark, said first information for sharing mark information with other computer systems;

storing, in response to said request, second information characterizing machine-specific attributes of the particular mark, said second information providing mark information which allows said computer system to access the particular on-line site using said at least one browser;

receiving a request to share marks with another user;

in response to said request to share said marks with another user, transferring said first information to the other user's computer;

receiving a request from the other user to access an on-line site represented by a mark which has been transferred to the other user; and in response to the request from the other user, translating first information for the mark into said second information for the mark, said second information for the mark representing machine-specific attributes of the mark relative to the other user's computer.

2. The method of claim 1, further comprising:

receiving user input for selecting a mark representing an on-line site;

in response to said user input, performing substeps of:

(i) if machine-specific information is stored for the selected mark, providing access to the on-line site represented by the selected mark by instructing one of said at least one browsers to navigate to the on-line site, and (ii) if machine specific information is not stored for the selected mark, first translating machine-independent information for the mark into machine-specific information and, thereafter, performing substep (i).

3. The method of claim 1, wherein said particular mark is a selected one of a Netscape Navigator Bookmark and a Microsoft Internet Explorer Favorite.

4. The method of claim 1, wherein said particular mark represents a reference to a non-Internet, proprietary on-line service.

5. The method of claim 4, wherein said particular mark represents a reference to a selected one of an America On-Line site and a CompuServe site.

6. The method of claim 1, further comprising:

grouping selected marks together in a user-created folder; and providing each folder so created with an identifying tab having a user provided name.

7. The method of claim 1, wherein said first information stores a mark type for indicating a particular driver which is required for correctly processing the mark.

8. The method of claim 7, wherein said particular driver comprises processing methods for processing native data of the mark.

9. The method of claim 8, wherein said particular driver comprises a Universal Request Locator (URL) capable driver.

10. The method of claim 9, wherein the URL capable driver includes support for Netscape Navigator Bookmarks and Microsoft Internet Explorer Favorites.

11. The method of claim 8, wherein said particular driver comprises a file driver for supporting access to objects on the user's own computer system.

12. The method of claim 1, wherein said at least one browser comprises a selected one of Netscape Navigator and Microsoft Internet Explorer.

13. The method of claim 1, further comprising:

representing at least one mark in the system with an icon derived from a graphic image copied from the on-line site for the mark.

* * * * *